(12) United States Patent
Nesbitt et al.

(10) Patent No.: US 9,958,282 B2
(45) Date of Patent: *May 1, 2018

(54) IDENTIFYING A ROUTE CONFIGURED TO TRAVEL THROUGH MULTIPLE POINTS OF INTEREST

(71) Applicant: FACEBOOK, INC., Menlo Park, CA (US)

(72) Inventors: David W. Nesbitt, Port Deposit, MD (US); W. Karl Renner, Great Falls, VA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/949,660

(22) Filed: Nov. 23, 2015

(65) Prior Publication Data
US 2016/0076900 A1 Mar. 17, 2016

Related U.S. Application Data

(63) Continuation of application No. 14/550,446, filed on Nov. 21, 2014, now abandoned, which is a continuation of application No. 13/620,597, filed on Sep. 14, 2012, now Pat. No. 8,924,148, which is a continuation of application No. 13/037,602, filed on Mar. 1, 2011, now Pat. No. 8,467,959, which is a
(Continued)

(51) Int. Cl.
G01C 21/34 (2006.01)
G01C 21/00 (2006.01)

(52) U.S. Cl.
CPC ......... G01C 21/3476 (2013.01); G01C 21/00 (2013.01)

(58) Field of Classification Search
CPC .. G01C 21/26; G01C 21/343; G01C 21/3415; G08G 1/096827; G08G 1/096861; G06Q 10/109; G06Q 10/025; G06Q 10/047; G06Q 30/0205
USPC ....... 701/117, 411, 532, 400, 408, 409, 426; 340/995.19, 990, 993
See application file for complete search history.

(56) References Cited

U.S. PATENT DOCUMENTS 5,608,635 A 3/1997 Tamai
5,610,815 A 3/1997 Gudat et al.
(Continued)

FOREIGN PATENT DOCUMENTS

WO WO 07/131225 11/2007

OTHER PUBLICATIONS

International Search Report and Written Opinion for International Application No. PCT/US07/68359, dated Feb. 29, 2008, 11 pages.
(Continued)

Primary Examiner — Dalena Tran
(74) Attorney, Agent, or Firm — Keller Jolley Preece

(57) ABSTRACT

A computer-implemented method for identifying a route that is configured to travel through multiple points of interest includes receiving a query that includes an origin location, a destination location, and at least a first point of interest and a second point of interest. The method also includes identifying a perimeter that surrounds the received origin and destination locations in response to the query. The perimeter is then used to identify a set of locations for each of the first and second points of interest.

20 Claims, 20 Drawing Sheets

Related U.S. Application Data continuation of application No. 11/617,874, filed on Dec. 29, 2006, now Pat. No. 7,920,965.

(60) Provisional application No. 60/829,695, filed on Oct. 17, 2006, provisional application No. 60/746,569, filed on May 5, 2006.

(56) References Cited

U.S. PATENT DOCUMENTS

| | | | |
|---|---|---|---|
| 5,682,525 A | 10/1997 | Bouve et al. | |
| 5,767,795 A | 6/1998 | Schaphorst | |
| 5,774,073 A | 6/1998 | Maekawa et al. | |
| 5,938,720 A | 8/1999 | Tamai | |
| 6,009,403 A | 12/1999 | Sato | |
| 6,026,346 A | 2/2000 | Ohashi et al. | |
| 6,317,685 B1 | 11/2001 | Kozak et al. | |
| 6,401,034 B1 | 6/2002 | Kaplan et al. | |
| 6,427,118 B1 | 7/2002 | Suzuki | |
| 6,498,982 B2 | 12/2002 | Bellesfield et al. | |
| 6,505,120 B2* | 1/2003 | Yamashita | G01C 21/3626 701/24 |
| 6,529,143 B2 | 3/2003 | Mikkola et al. | |
| 6,553,310 B1 | 4/2003 | Lopke | |
| 6,587,782 B1 | 7/2003 | Nocek | |
| 6,708,110 B2 | 3/2004 | Stefan et al. | |
| 6,785,608 B1 | 8/2004 | Milici et al. | |
| 6,829,533 B2 | 12/2004 | Shitamatsu et al. | |
| 6,839,628 B1 | 1/2005 | Tu | |
| 6,915,204 B1 | 7/2005 | Heideman | |
| 6,993,429 B2 | 1/2006 | Obradovich et al. | |
| 7,146,273 B2 | 12/2006 | Kadono et al. | |
| 7,209,829 B2 | 4/2007 | Litvack et al. | |
| 7,239,960 B2* | 7/2007 | Yokota | G01C 21/3476 340/995.19 |
| 7,546,202 B2 | 6/2009 | Oh | |
| 7,729,947 B1 | 6/2010 | Philbin et al. | |
| 7,761,350 B1 | 7/2010 | Ridgeway | |
| 7,826,965 B2 | 11/2010 | Sadri et al. | |
| 7,840,689 B2* | 11/2010 | Stewart | H04L 29/06 709/202 |
| 7,899,615 B2 | 3/2011 | Arnold-Huyser et al. | |
| 7,920,965 B1 | 4/2011 | Nesbitt | |
| 8,095,303 B1 | 1/2012 | Nesbitt | |
| 8,467,959 B2 | 6/2013 | Nesbitt | |
| 8,781,729 B2 | 7/2014 | Nesbitt | |
| 8,924,148 B2 | 12/2014 | Nesbitt | |
| 2006/0064242 A1 | 3/2006 | Litvack | |
| 2006/0089788 A1 | 4/2006 | Laverty | |
| 2008/0086455 A1* | 4/2008 | Meisels | G01C 21/26 |
| 2013/0060460 A1 | 3/2013 | Nesbitt | |
| 2015/0081206 A1 | 3/2015 | Nesbitt | |
| 2015/0081208 A1 | 3/2015 | Nesbitt | |

OTHER PUBLICATIONS

U.S. Appl. No. 11/617,874, Jul. 15, 2010, Office Action.
U.S. Appl. No. 11/617,874, Dec. 3, 2010, Notice of Allowance.
U.S. Appl. No. 12/111,657, Sep. 15, 2011, Notice of Allowance.
U.S. Appl. No. 13/037,602, Oct, 3, 2012, Office Action.
U.S. Appl. No. 13/037,602, Mar. 15, 2013, Notice of Allowance.
U.S. Appl. No. 13/342,436, Oct. 10, 2013, Office Action.
U.S. Appl. No. 13/342,436, Mar. 17, 2014, Notice of Allowance.
U.S. Appl. No. 13/620,597, Sep. 30, 2013, Office Action.
U.S. Appl. No. 13/620,597, Mar. 21, 2014, Office Action.
U.S. Appl. No. 13/620,596, Dec. 4, 2013, Office Action.
U.S. Appl. No. 14/550,446, Oct. 6, 2015, Office Action.
U.S. Appl. No. 14/550,697, Oct. 15, 2015, Office Action.

* cited by examiner

500A

| TYPE OF INTEREST — 510 | CLOSEST CHOICES — 520 | NEXT CLOSEST CHOICES — 530 | NEXT CLOSEST CHOICES — 540 |
|---|---|---|---|
| Gas Station | 1210 Seven Lock Rd Potomac Maryland (0.2 mile away from the preliminary route) | 1335 Wisconsin Ave. Rockville, Maryland (0.6 mile away from The preliminary route) | 4444 Rockville Pike Rockville, Maryland (1 mile away from the preliminary route) |
| Restaurant | 555 Tuckerman Lane Potomac, Maryland (0.5 mile away from the preliminary route) | 555 Tuckerman Lane Potomac, Maryland (0.5 mile away from the preliminary route) | 111 Rockville Pike Rockville, Maryland (0.9 mile away from the preliminary route) |
| Grocery Store | 1213 Seven Lock Rd Potomac, Maryland (0.2 mile away from the preliminary route) | 1212 Tuckerman Lane, Potomac Maryland (0.7 miles away from the preliminary route) | 333 Rockville Pike, Rockville, Maryland (1.5 miles away from the preliminary route) |
| Travel Time — 550 | 45 min | 50 min | 70 min |
| Travel Distance — 560 | 25 miles | 30 miles | 40 miles |

| | CLOSEST CHOICES (520) | NEXT CLOSEST CHOICES (530) | NEXT CLOSEST CHOICES (540) |
|---|---|---|---|
| Stop 1 | McDonald's™ at 555 Tuckerman Lane Potomac, Maryland (0.5 mile away from the preliminary route) | Safeway™ at 1212 Tuckerman Lane Potomac Maryland (0.7 miles away from the preliminary route) | bp™ gas station at 4444 Rockville Pike Rockville, Maryland (1 mile away from the preliminary route) |
| Stop 2 | bp™ gas station at 1210 Seven Lock Rd Potomac Maryland (0.2 mile away from the preliminary route) | McDonald's™ at 555 Tuckerman Lane Potomac, Maryland (0.5 mile away from the preliminary route) | Safeway™ at 333 Rockville Pike, Rockville, Maryland (1.5 miles away from the preliminary route) |
| Stop 3 | Safeway™ at 1213 Seven Lock Rd Potomac, Maryland (0.2 mile away from the preliminary route) | Exxon™ gas station at 1335 Wisconsin Ave. Rockville, Maryland (0.6 mile away from The preliminary route) | McDonald's™ at 111 Rockville Pike Rockville, Maryland (0.9 mile away from the preliminary route) |
| Travel Time (550) | 44 min | 49 min | 67 min |
| Travel Distance (560) | 24.8 miles | 29.9 miles | 39 miles |

| ALTERNATIVE ADVANCED ROUTES WITHIN THE CLOSEST CHOICES COLUMN 520 | FIRST ALTERNATIVE (660) | SECOND ALTERNATIVE (670) | THIRD ALTERNATIVE (680) |
|---|---|---|---|
| | McDonald's™ at 555 Tuckerman Lane Potomac, Maryland (0.5 mile away from the preliminary route) | McDonald's™ at 555 Tuckerman Lane Potomac, Maryland (0.5 mile away from the preliminary route) | Safeway™ at 1213 Seven Lock Rd Potomac, Maryland (0.2 mile away from the preliminary route) |
| | bp™ gas station at 1210 Seven Lock Rd Potomac Maryland (0.2 mile away from the preliminary route) | Safeway™ at 1213 Seven Lock Rd Potomac, Maryland (0.2 mile away from the preliminary route) | McDonald's™ at 555 Tuckerman Lane Potomac, Maryland (0.5 mile away from the preliminary route) |
| | Safeway™ at 1213 Seven Lock Rd Potomac, Maryland (0.2 mile away from the preliminary route) | bp™ gas station at 1210 Seven Lock Rd Potomac Maryland (0.2 mile away from the preliminary route) | bp™ gas station at 1210 Seven Lock Rd Potomac Maryland (0.2 mile away from the preliminary route) |
| Travel Time (690A) | 44 min | 46 min | 47 min |
| Travel Distance (690B) | 24.8 miles | 25.1 miles | 25.2 miles |

| | THE MOST EFFICIENT ROUTE WITHIN THE CLOSEST CHOICES COLUMN 520 | THE MOST EFFICIENT ROUTE WITHIN THE NEXT CLOSEST CHOICES COLUMN 530 | THE MOST EFFICIENT ROUTE WITHIN THE NEXT CLOSEST CHOICES COLUMN 540 |
|---|---|---|---|
| TRAVEL TIME | 44 min. | 43 min. | 55 min. |
| TRAVEL DISTANCE | 24.8 miles | 24.9 miles | 30 miles |
| | | | |

You have identified the starting location as (1425 K St. NW, Washington D.C. 20005).
You have identified the destination location as the (United States Patent and Trademark Office).
You have identified the following points of interest that you should visit on your way: (Gas station and Grocery store).

The following are suggested routes that are configured to include the identified points of interest:
☐ Route A (The total travel time is 45 minutes):
    You should travel from the starting location to the Grocery store at (1235 Gainsborough Rd., Alexandria, VA, 20854).
    From the Grocery store you should travel to the Gas station at (333 Lane Rd., Alexandria, VA 20007).
    From the Gas station you should travel to the USPTO at (1233 Commissioner Avenue, Alexandria, VA 25432)

☐ Route B (The total travel time is 60 minutes):
    You should travel from the starting location to the Gas station at (1111 Old Town, Alexandria, VA, 20854).
    From the Gas station store you should travel to the Grocery store at (222 Commissioner Avenue, Alexandria 21654).
    From the Grocery store you should travel to the USPTO at (1233 Commissioner Avenue, Alexandria, VA 25432)

FIG. 9A

IDENTIFYING A ROUTE CONFIGURED TO TRAVEL THROUGH MULTIPLE POINTS OF INTEREST

CROSS-REFERENCE TO RELATED APPLICATIONS

This application is a continuation of U.S. application Ser. No. 14/550,446, filed Nov. 21, 2014, which is a continuation of U.S. application Ser. No. 13/620,597, filed Sep. 14, 2012, now issued as U.S. Pat. No. 8,924,148, which is a continuation of U.S. application Ser. No. 13/037,602, filed Mar. 1, 2011, now issued as U.S. Pat. No. 8,467,959, which is a continuation of U.S. application Ser. No. 11/617,874, filed Dec. 29, 2006, now issued as U.S. Pat. No. 7,920,965, which claims priority from U.S. Provisional Application Ser. No. 60/746,569, filed on May 5, 2006, and from U.S. Provisional Application Ser. No. 60/829,695, filed Oct. 17, 2006. The entire contents of the prior applications are incorporated herein by reference.

TECHNICAL FIELD

This document relates to identifying a route configured to travel through multiple points of interest.

BACKGROUND

A traveler may submit to a host a mapping query to request mapping information, such as a suggested route between an origin location and a destination location or driving directions to a destination location from an origin location.

SUMMARY

According to one general aspect, a computer-implemented method for identifying a route that is configured to travel through multiple points of interest includes receiving a query that includes an origin location, a destination location, and at least a first point of interest and a second point of interest. In response to receiving the query, the method includes identifying a perimeter that surrounds the received origin and destination locations. The method also includes using the identified perimeter as a basis for identifying a first set of potential locations that corresponds to the received first point of interest and that represents less than all potential locations corresponding to the first point of interest. The method also includes using the identified perimeter as a basis for identifying a second set of potential locations that corresponds to the received second point of interest and that represents less than all potential locations corresponding to the second point of interest. The method also includes selecting, from the first and second set of locations, respectively, a single first potential location corresponding to the received first point of interest and a single second potential location corresponding to the received second point of interest. The method also includes displaying, as an advanced route, a route from the origin location to the destination location that travels through the selected single first potential location corresponding to the received first point of interest and the selected single second potential location corresponding to the received second point of interest.

Implementations of the above general aspect may include one or more of the following features. For example, the first point of interest and the second point of interest may each include an indication of an establishment having multiple locations associated therewith. For another example, identifying the perimeter that surrounds the received origin and destination locations may include identifying an elliptical perimeter.

Implementations of the above general aspect may also include determining whether each of the first and second points of interest include at least one location within the perimeter and expanding parameters of the perimeter if it is determined that at least one of the first or second point of interest does not include the at least one location within the perimeter. Identifying the perimeter that surrounds the received origin and destination locations may include identifying an elliptical perimeter.

Selecting the single first potential location corresponding to the received first point of interest and the single second potential location corresponding to the received second point of interest may further include identifying a preliminary route as an starting solution that includes one first location associated with the first point of interest and one second location associated with the second point of interest, wherein the first and second locations are selected from the first and second sets of potential locations, identifying a travel commitment for the preliminary route, storing the preliminary route as a preferred route, altering the preferred route to identify a new route, identifying a travel commitment associated with the new route, comparing the travel commitment associated with the new route with the travel commitment associated with the preferred route, and if the travel commitment associated with the new route is less than the travel commitment associated with preferred route, storing the new route as the preferred route. The travel commitment may include travel time or a travel distance.

Altering the preferred route to identify the new route may include rearranging the order in which the locations associated with the first and second points of interest are visited in the preferred route. Alternatively or additionally, altering the preferred route to identify the new route may include selecting a new location associated with at least one of the first or second point of interest, and including the newly selected location and at least one location that appears in the preferred route within the new route. Including the newly selected location within the new route may include displacing one of the locations associated with either the first or second point of interest within the preferred route with the newly selected location. The new location may supplement the locations associated with the first and second points of interest within the preferred route. Selecting the new location may include selecting the new location from the first or the second set of potential locations.

The method may also include determining whether a time limitation has been reached and displaying the preferred route to the user if it is determined that the time limitation has been reached. The time limitation may begin to expire from a time the process of selecting the single first potential location corresponding to the received first point of interest and the single second potential location corresponding to the received second point of interest begins and the time limitation may expire at a pre-defined expiration time; thus, enabling the user to identify the advanced route within a reasonable time frame. The pre-defined expiration time may be defined by the user or a host. The method also may include displaying the new route to the user if it is determined that the travel commitment of the new route is less than the threshold.

Selecting the single first potential location corresponding to the received first point of interest and the single second potential location corresponding to the received second point of interest may further include identifying co-located locations associated with the first and second points of interest within the first and second sets of potential locations, identifying a route associated with each of the co-located locations, the route configured to travel through the co-located locations, identifying a travel commitment associated with each identified route, and comparing the travel commitment of the identified routes to identify an advanced route with a minimized travel commitment. Identifying co-located locations may include searching, within the second set of potential locations, for a location that appears close to each location appearing in the first set of potential locations, and as a result of the search, identifying one or more co-located locations associated with the first and second points of interest. The co-located locations may include location that appear within a pre-defined time or distance from each other. The travel commitment may include travel time or a travel distance.

Receiving the query may include receiving multiple keywords each identifying one of the origin location, the destination location, and at least the first point of interest and the second points of interest. Receiving the multiple keywords may include receiving the multiple keywords concurrently. Alternatively or additionally, receiving the multiple keywords may include receiving each one of the multiple keywords at a different time.

The origin location, the destination location, and the at least first point and the second point of interest forming the query may each be received from a different source.

According to another general aspect, a computer-implemented method for identifying a route that is configured to travel through multiple points of interest includes receiving a query that includes an origin location, a destination location, and at least a first point of interest and a second point of interest and determining a preliminary route from the origin location to the destination location. The method also includes identifying a first set of potential destinations that corresponds to the received first point of interest and that represents less than all potential destinations corresponding to the first point of interest, the potential destinations within the first set being identified based on a relatedness of the potential destinations to the first point of interest and also based on a geographic proximity of the potential destinations to the determined preliminary route. The method also includes identifying a second set of potential destinations that corresponds to the received second point of interest and that represents less than all potential destinations corresponding to the second point of interest, the potential destinations within the second set being identified based on a relatedness of the potential destinations to the second point of interest and also based on a geographic proximity of the potential destinations to the determined preliminary route. The method also includes selecting, among the first and second sets of potential destinations identified, respectively, a single first potential destination corresponding to the received first point of interest and a single second potential destination corresponding to the received second point of interest. The method also includes displaying, as an advanced route, a route from the origin location to the destination location through the selected single first potential destination corresponding to the received first point of interest and the selected single second potential destination corresponding to the received second point of interest.

Implementations of the above general aspect may include one or more of the following features. For example, identifying the first and the second sets of potential destinations based on the geographic proximity of the potential destinations to the preliminary route may include identifying the first and the second sets of potential destinations based on distance along roads from the preliminary route to the potential destinations. Alternatively or additionally, identifying the first and the second sets of potential destinations based on the geographic proximity of the potential destinations to the preliminary route may include identifying the first and the second sets of potential destinations based on estimated time of travel from the preliminary route to the potential destinations. Identifying the first set of potential destinations may include identifying the first set of potential destinations representing at least multiple locations for the received first point of interest.

Selecting the single first and second potential locations may further include identifying a preliminary route as an starting solution that includes one first potential destination associated with the first point of interest and one second potential destination associated with the second point of interest, wherein the first and second potential destinations are selected from the first and second sets of potential destinations, identifying a travel commitment associated with the preliminary route, storing the preliminary route as a preferred route, altering the preferred route to identify a new route, comparing the travel commitment associated with the new route with the travel commitment associated with the preliminary route, and if the travel commitment associated with the new route is less than the travel commitment associated with the preferred route, storing the new route as the preferred route. The travel commitment may include travel time or a travel distance.

Altering the preferred route to identify the new route may include rearranging the order in which the destinations associated with the first and second points of interest are visited in the preferred route. Alternatively or additionally, altering the preferred route to identify the new route may include selecting a new destination associated with at least one of the first or second point of interest, and including the newly selected destination and at least one destination that appears in the preferred route within the new route. Including the newly selected destination within the new route may include displacing one of the destinations associated with either the first or second point of interest within the preferred route with the newly selected destination. The new destination may supplement the destinations associated with the first and second points of interest within the preferred route.

The method also may include identifying a perimeter around the preliminary route and using the identified perimeter as a basis for identifying the first and second sets of potential destinations. Identifying the perimeter may include identifying a perimeter that has an elliptical shape. The method also may include determining that at least one of the first and second points of interest does not include a location within the first perimeter, identifying a second perimeter formed around and outside of the first perimeter, and identifying a set of locations for the at least one of the first and second points of interest that is within the second perimeter.

According to another general aspect, a computer-implemented method for identifying a route that is configured to travel through multiple points of interest includes receiving a query that includes an origin location, a destination location, and at least a first point of interest and a second point of interest and identifying a first location associated with the first point of interest and a second location associated with the second point of interest. The method also includes displaying, as a first advanced route, a route from the origin location to the destination location that travels through the identified first location associated with the first point of interest and the identified second location associated with the second point of interest. The method also includes identifying a different first location associated with the first point of interest and a different second location associated with the second point of interest and displaying, as a second advanced route, a route from the origin location to the destination location that travels through the identified different first location associated with the first point of interest and the identified different second location associated with the second point of interest. The method also includes enabling a user to select from among the first and second identified advanced routes.

Implementations of the above general aspect may include one or more of the following features. For example, the first advanced route and the second advanced route may be displayed concurrently.

For another example, identifying the first location and the second location may further include determining a preliminary route from the origin location to the destination location, identifying a first set of potential locations that corresponds to the received first point of interest and that represents less than all potential locations corresponding to the first point of interest, the potential locations within the first set being identified based on a relatedness of the potential locations to the first point of interest and also based on a geographic proximity of the potential locations to the determined preliminary route, identifying a second set of potential locations that corresponds to the received second point of interest and that represents less than all potential locations corresponding to the second point of interest, the potential locations within the second set being identified based on a relatedness of the potential locations to the second point of interest and also based on a geographic proximity of the potential locations to the determined preliminary route, and, among the first and second sets of potential destinations identified, respectively, selecting the first location and the second location.

Identifying the first different location and the second different location may further include selecting from among the first and second sets of potential destinations identified, respectively the first different location and the second different location. Locations associated with the first and second points of interest may include geographic locations or addresses. Alternatively or additionally, locations associated with the first and second points of interest may include facility names of the first and second points of interest. The first and second points of interest may include first and second establishments, respectively, wherein the first and second establishment each may include one or more locations associated therewith. Alternatively or additionally, the first and second points of interest may include first and second facility names, respectively. Alternatively or additionally, the first and second points of interest may include first and second desired objects, respectively, in which the user is interested. Alternatively or additionally, the first and second desired objects may include objects associated with a particular activity.

The first and second establishments may each be associated with a particular location. The particular location may include a geographical location. The particular location associated with the first establishment may include a particular geographical location and the particular location associated with the second establishment includes a particular facility name.

The method also may include identifying that the first advanced route is selected by the user, and in response to the user selecting the first advanced route, providing the user with point-to-point directions/maps for the first advanced route. The point-to-point directions/maps may begin at the origin location, pass through the first and second locations associated with the first and second points of interest, respectively, and end at the destination location. The origin location and the destination location may each include a geographical location. The origin location may include a geographical location and the destination location may include a facility name.

Implementations of the described techniques may include hardware, a method or process, or computer software on a computer-accessible medium.

The details of one or more implementations are set forth in the accompanying drawings and the description below. Other features will be apparent from the description and drawings, and from the claims.

DESCRIPTION OF DRAWINGS

FIG. 5A illustrates an exemplary table that a host may use to identify an advanced route having a minimized travel commitment.

FIG. 5B illustrates an exemplary table in which the host rearranges the locations included in the advanced route identified in FIG. 5A to reduce the travel commitment associated with the advanced route.

FIGS. 6A-6B illustrate an exemplary process and an exemplary table a host may use to identify the most efficient route associated with selected locations for multiple points of interest.

FIGS. 7A-7B illustrate an exemplary process and an exemplary table a host may use to identify an advanced route having the "least" travel commitment.

FIGS. 9A-9B illustrate exemplary user interfaces each displaying multiple routes responsive to a search query, and thus enabling the user to select from among the displayed multiple routes.

DETAILED DESCRIPTION

A user of a client device may wish to travel from an origin location to a destination location, and the user may wish to visit multiple points of interest along the way. For example, the user may wish to visit a convenient automated teller machine ("ATM"), a grocery store, a gas station, and a dry cleaner along a commuting route or a planned vacation route. As such, the user may benefit from an advanced route that includes and thus encourages travel through a convenient location for each of the user-identified multiple points of interest. Accordingly, techniques are provided for generating such an advanced route that includes a location for each of the user-identified multiple points of interest. In one implementation, the techniques described in this application enable a host to generate the advanced route without excessive computational delay.

Figure 1:
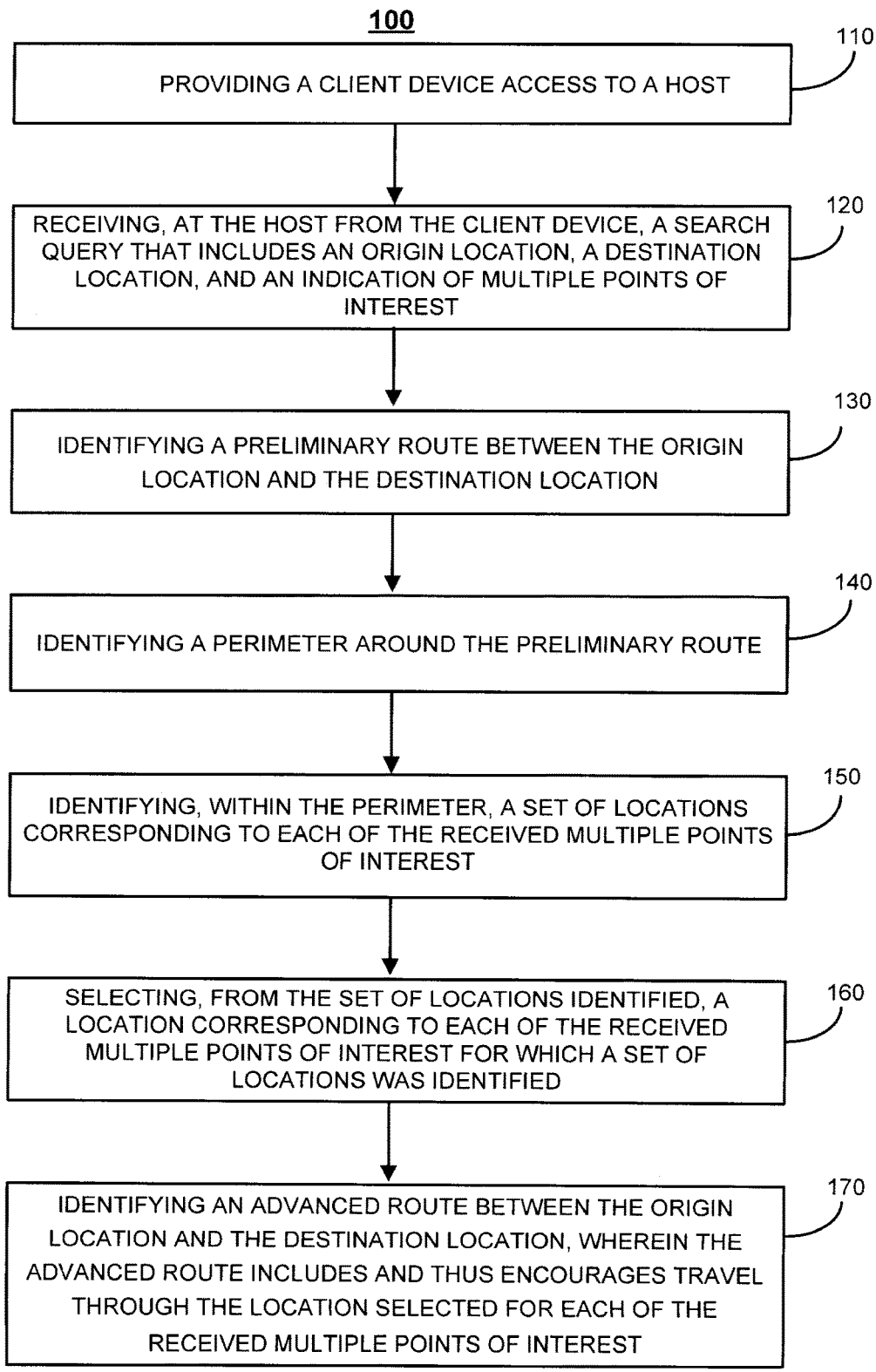
FIG. 1 illustrates a flow chart of an exemplary process a host may use to identify an advanced route between an origin location and a destination location, such that the advanced route includes a location for each of user-identified multiple points of interest.

An exemplary process 100 of FIG. 1 may be used by a host to identify an advanced route between an origin location and a destination location, such that the advanced route includes and thus encourages travel through a location for each of user-identified multiple points of interest. Below, process 100 is described with brief reference to other illustrative figures, each of which are later described separately. Process 100 begins by providing a client device with access to the host (110). Providing the client device access to the host may include providing the client device with a user interface, such as that of FIGS. 2A and 2B, for submitting a search query to the host.

The host receives the search query, including an origin location, a destination location, and an indication of multiple points of interest (120). The multiple points of interest may include intermediary services, such as banking services, dry cleaning services, flower shop services, grocery store services, and/or gas stations services. The host may receive the search query via, for example, a request and/or message from the client device.

Figure 3:
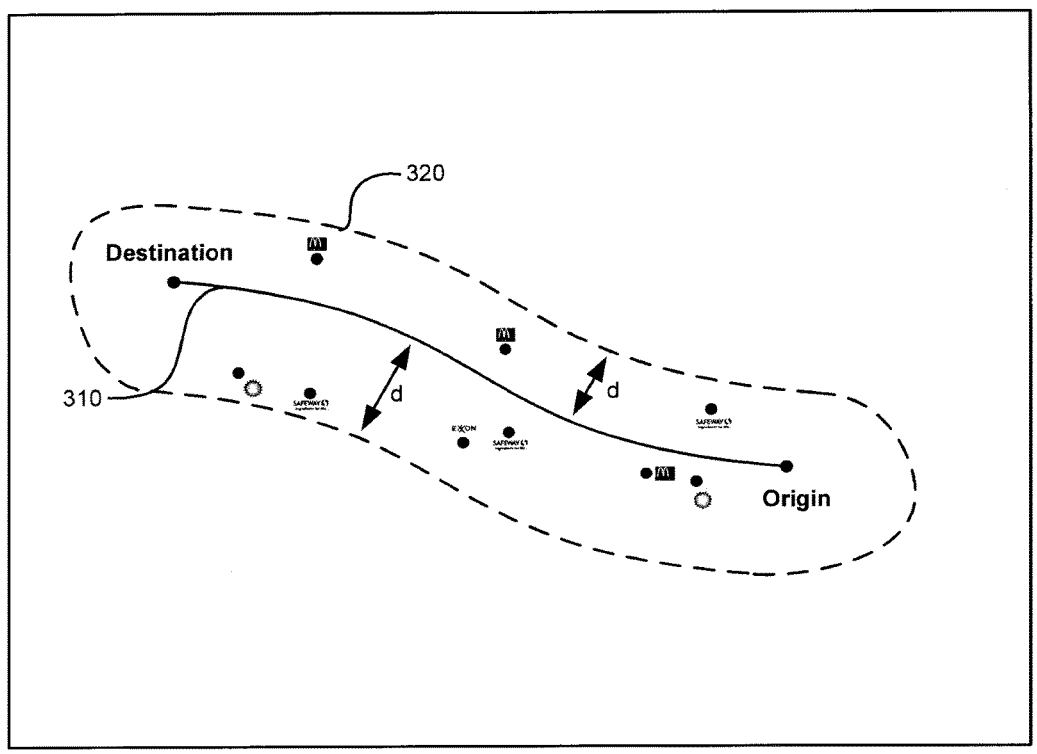
FIG. 3 illustrates a map that is used to identify a set of locations corresponding to each of user-identified multiple points of interest.

In response to the search query, the host identifies a preliminary route between the origin location and the destination location (130). FIG. 3 illustrates a preliminary route 310 the host may identify between the origin location and the destination location. The host identifies a perimeter around the preliminary route (140). The host may use an exemplary process 400 described with respect to FIG. 4 to identify the perimeter around the preliminary route. As shown in FIG. 3, the perimeter 320 includes an elliptical shape and is formed around the preliminary route 310. The host identifies, within the elliptical perimeter, a set of locations corresponding to each of the received multiple points of interest (150). The set of locations may include a set of geographic locations or addresses. Alternatively or additionally, the set of locations may include a set of zip codes, street addresses and/or facility names.

In one example and as shown in FIG. 3, where the multiple points of interest include a gas station, a grocery store, and a restaurant, the host identifies a set of locations within the elliptical route 320 that correspond to the gas station, a set of locations corresponding to the grocery store, and a set of locations corresponding to the restaurant. The host selects, from the set of locations identified, a location corresponding to each of the user-identified multiple points of interest for which the set of locations was identified (160). In keeping with the example of FIG. 3, the host selects, from the set of locations identified, a location for the gas station, a location for the grocery store, and a location for the restaurant, for example, using tables and processes described with respect to FIGS. 5A-5B and 6A-6B. Based on this selection, the host identifies an advanced route between the origin location and the destination location, where the advanced route includes and thus encourages travel through the selected location for each of the user-identified multiple points of interest (170). Again keeping with the example of FIG. 3, process 100 thus resolves an advanced route that includes a location for the gas station, the grocery store, and the restaurant.

Figure 2A:
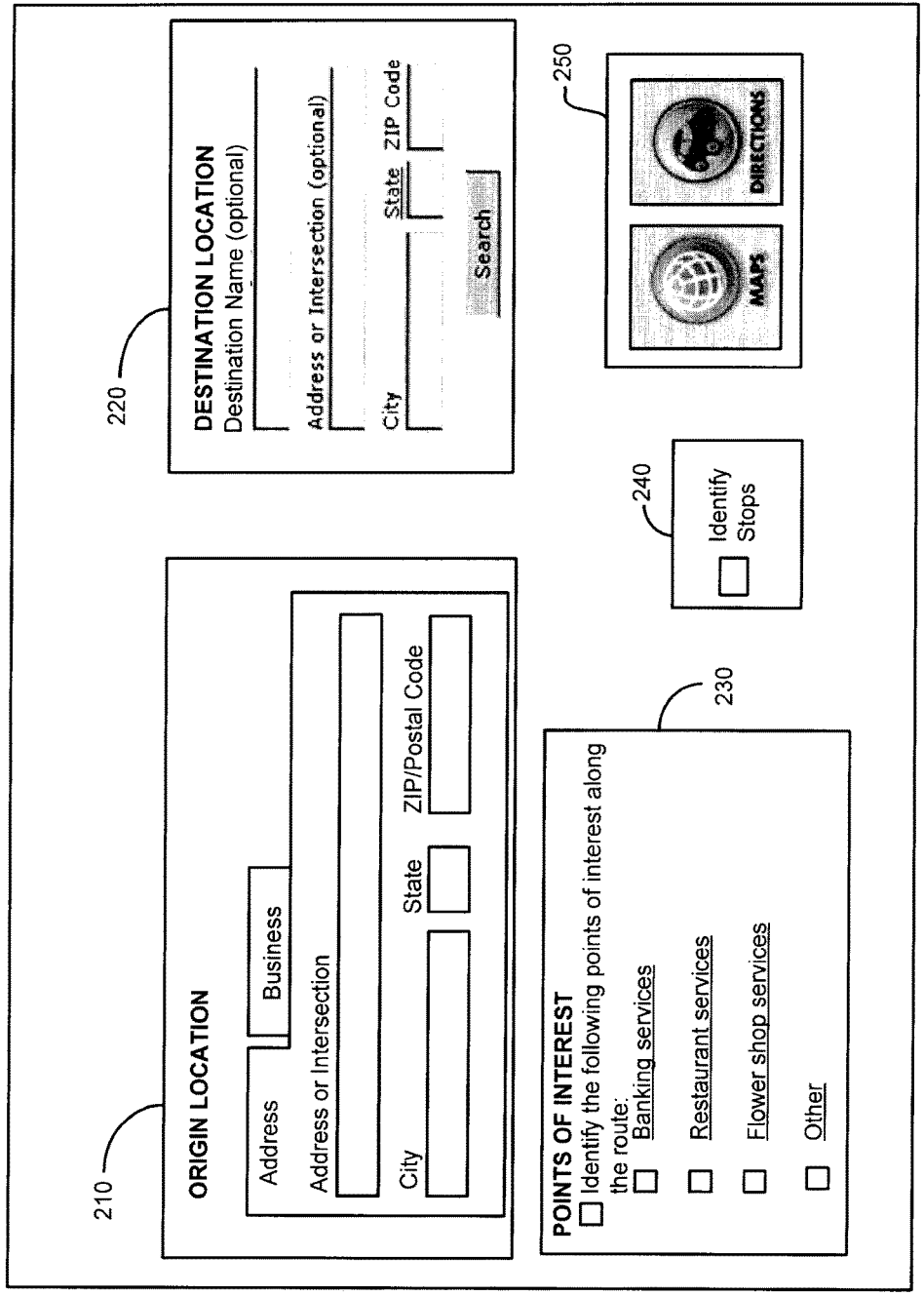
FIG. 2A illustrates an exemplary user interface provided to a user of a client device wishing to visit multiple points of interest along a route from an origin location to a destination location.

More specifically, FIG. 2A illustrates an exemplary user interface ("UI") 200A provided to a user of a client device, wishing to visit multiple points of interest along a route from an origin location to a destination location. The UI 200A may be displayed, for example, on an in-vehicle navigation system, a mobile device, such as a cellular phone or PDA, or other devices, such as a personal computer.

The UI 200A includes an origin selection portion 210, a destination selection portion 220, a points of interest selection portion 230, an identify stops portion 240, and a directions/maps selection portion 250. The origin selection portion 210 enables the host to solicit or otherwise receive an origin or a starting location. The origin selection portion 210 includes fields enabling specification of an address or an intersection, a city, a state, and a zip code. The destination selection portion 220 enables the host to solicit or otherwise receive a destination location. The destination selection portion 220 includes fields enabling specification of a destination name, an address or an intersection, a city, a state, and a zip code.

The UI 200A also includes the points of interest selection portion 230. The points of interest selection portion 230 enables the host to solicit or otherwise receive multiple points of interest that the user wishes to visit along a route between the origin location and the destination location. The points of interest selection portion 230 includes a user selectable option for identifying each of the multiple points of interest. The multiple points of interest may include banking services, restaurant services, flower shop services, and/or "other" services or places, such as gas stations, shopping centers, and/or grocery stores. In one implementation, shown in FIG. 2A, the user may communicate to the host a desired point of interest by selecting a box corresponding to that point of interest.

A representation of a point of interest in UI 200A may be interactive. For example, the user may interact with the point of interest by selecting the point of interest in the UI 200A (e.g., double clicking on the point of interest using, for example, a mouse). Selecting the point of interest may launch another UI, enabling the user to provide additional information regarding the point of interest to the host. For instance, selecting "banking services" may launch another UI, enabling the user to identify the type of banking services in which the user is interested (e.g., a type of branch and/or ATM services).

The UI 200A also includes the identify stops portion 240. The identify stops portion 240 enables the host to solicit or otherwise identify particular stops along the route. When the user selects the identify stops portion 240, a UI for entering information about a particular stop (e.g., UI 240 of FIG. 2B)

is displayed. For example, the identify stops portion 240 may enable the user to identify an address of the particular stops. Alternatively or additionally, the identify stops portion 240 may enable the user to specify a name of a particular stop and/or geographical area in which particular stop is located. For example, the identify stops portion 240 may enable the user to specify a favorite banking service in a particular area (e.g. Bank of America in the NW quadrant of Washington D.C.). Similarly, the identify stops portion 240 may enable the user to specify a name of a particular restaurant in which the user is interested.

Figure 2B:
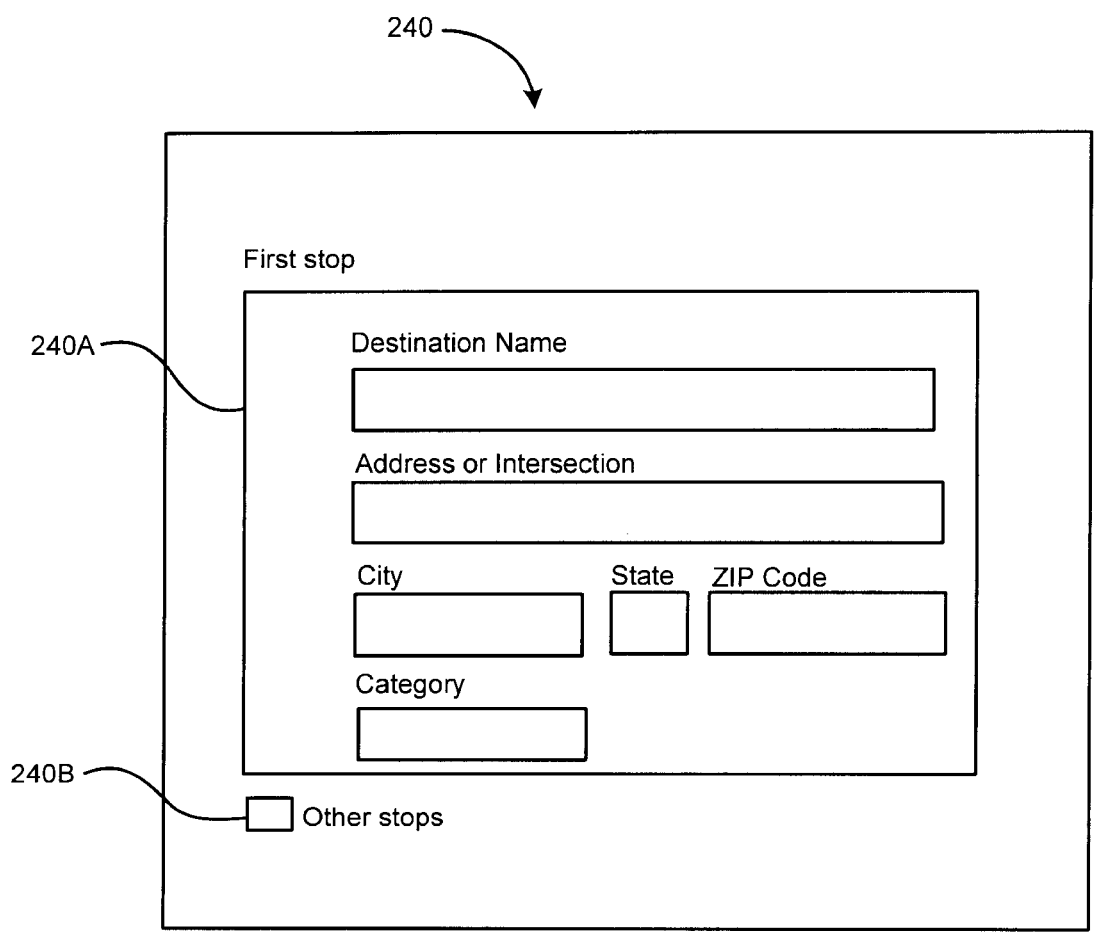
FIG. 2B illustrates an exemplary user interface for entering information about a particular stop.

FIG. 2B illustrates an exemplary UI 240 for entering information about a particular stop. The UI 240 includes a first stop selection portion 240A and "other" stops selection portion 240B. The first stop selection portion 240A includes fields enabling specification of a destination name, an address or an intersection, a city, a state, a zip code, and a category name. The category name field indicates the category or type of stop, such as gas, cash, or restaurant. The "other" stops selection portion 240B enables the user to provide additional particular stops to the host.

Referring again to FIG. 2A, the UI 200A also includes the directions/maps selection portion 250. The directions/maps selection portion 250 enables the user to receive directions/maps between the origin location and the destination location through the location associated with the user-identified multiple points of interest.

FIG. 3 illustrates a map 300 that is used to identify a set of locations corresponding to each of the user-identified multiple points of interest. The map 300 includes an origin location, a destination location, and a preliminary route 310 between the origin location and the destination location. The map 300 also includes a perimeter 320 that has an elliptical shape and that is formed around the preliminary route 310. The elliptical perimeter 320 is used to identify a set of locations corresponding to each of the received multiple points of interest. Using the elliptical perimeter 320 to identify a set of locations corresponding to each of the multiple points of interest may increase the efficiency in identifying an advanced route traveling through the user-identified multiple points of interest.

Figure 4:
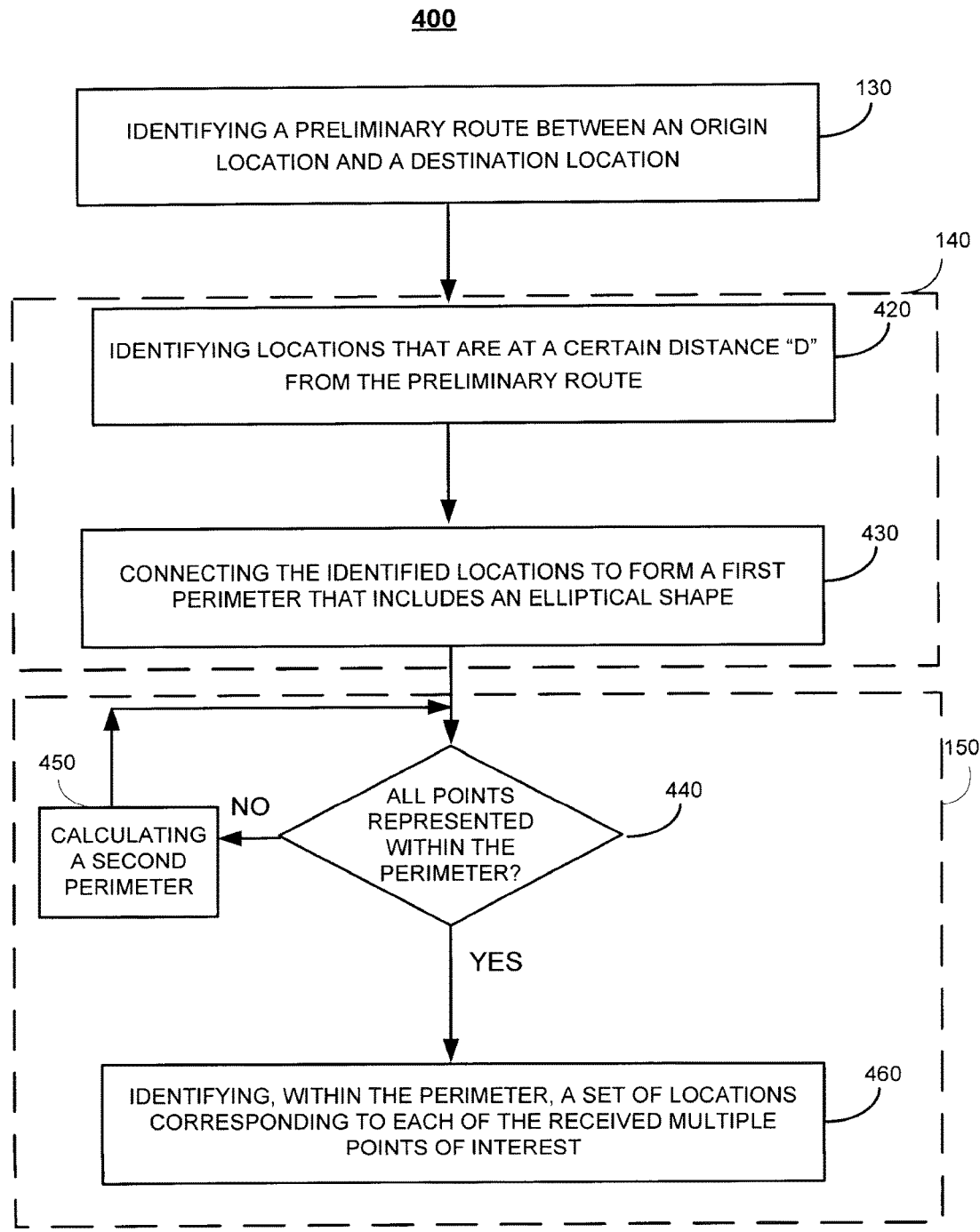
FIG. 4 illustrates a flow chart of an exemplary process a host may use to identify the elliptical perimeter around the preliminary route illustrated by FIG. 3.

FIG. 4 illustrates a flow chart of an exemplary process 400 a host may use to identify or otherwise calculate the elliptical perimeter 320 around the preliminary route 310 illustrated by FIG. 3. The process 400 illustrates in more detail the blocks 130, 140, and 150 associated with the process 100 described above with respect to FIG. 1. Initially, the host identifies the preliminary route 310 between the origin location and the destination location (410). The host may identify the preliminary route 310 by referencing an internal server, which in turn references roads, coupling the origin location to the destination location. Alternatively, the host may identify the preliminary route 310 by referencing an external server, such as a web map server (e.g., Mapquest™) that employs one or more geocoding servers, mapping servers, and/or routing servers to generate the preliminary route 310. Upon identification of the preliminary route 310, the host may identify locations (e.g., latitude/longitude coordinates) that are at a certain distance "d" from points along the preliminary route 310 (or map tiles/sectors corresponding thereto) (420). In one implementation, the host selects the distance "d." In another implementation, the user selects the distance "d." Once the locations at the distance "d" along the preliminary route 310 are identified, the host connects these locations (as presented by broken lines in FIG. 3) to form a first perimeter 320 around the preliminary route 310, which may include an elliptical shape as shown in FIG. 3 (430).

The host uses the elliptical perimeter 320 to identify a subset from among the universe of locations otherwise corresponding to each of the user-identified multiple points of interest. The host first determines whether the elliptical perimeter 320 includes at least one location for each of the user-identified multiple points of interest (440). If so (e.g., all of the user-identified multiple points of interest are represented within the elliptical perimeter 320, the host identifies, within the elliptical perimeter 320), a set of locations for each of the user-identified multiple points of interest (460). For example and referring again to FIG. 3, when the search query includes identifying a gas station, a grocery store, and a restaurant along the route, the host may identify within the elliptical perimeter 320 a set of locations for the gas station, a set of locations for the grocery store, and a set of locations for the restaurant. As shown in FIG. 3, the set of locations for the gas station includes three different locations for a "Brand" gas station; the set of locations for the restaurant includes three different locations for McDonald's™; and the set of locations for the grocery store includes three different locations for Safeway™.

If the host fails to identify, within the elliptical perimeter 320, a location associated with at least one of the multiple points of interest, the host calculates a second perimeter (450). The second perimeter may include an elliptical shape and may be calculated in the same manner as the elliptical perimeter 320, however, the second perimeter may include a larger distance "d" from the points along the preliminary route 310. As such, the second perimeter may be larger than the elliptical perimeter 320 and may surround the elliptical perimeter 320. Upon calculating the second perimeter, the host again determines whether all the user-identified multiple points of interest are represented within the second perimeter (440). If so, the host identifies, within the second perimeter, a set of locations for the at least one of the multiple points of interest (460).

The host selects, from each set of locations identified, a location corresponding to each of the multiple points of interest for which the set of locations was identified. The host uses the selected locations to identify an advanced route that includes and thus encourage travel through the selected location for the multiple points of interest. In one example and as described below with respect to FIGS. 5A-5B, the host identifies multiple advanced routes by selecting, from each set of locations, multiple locations corresponding to each of the multiple points of interest. The host calculates the travel commitment that includes travel time and/or travel distance for each of the multiple advanced routes and selects the advance route for which the travel commitment is minimized.

FIG. 5A illustrates an exemplary table 500A that a host may use to identify an advanced route having a minimized travel commitment. Table 500A includes type of interest column 510, closest choices column 520, next closest choices column 530, and next closest choices column 540. The type of interest column 510 identifies the type of interest, which includes categories for a gas station, a restaurant, and a grocery store. The closest choices column 520, the next closest choices column 530, and the next closest choices column 540 each represent different advanced routes that include a location corresponding to each of the multiple points of interest. The location includes an address and a travel distance of the type of interest from the preliminary route 310.

Table 500A also includes a travel time row 550 and a travel distance row 560. The travel time row 550 identifies the travel time for the advanced route in the closest choices column 520, the next closest choices column 530, and the next closest choices column 540. The travel distance row 560 identifies the travel distance for the advanced route in the closest choices column 520, the next closest choices column 530, and the next closest choices column 540. The host may be configured to use the travel time row 550 and/or the travel distance row 560 to identify an advanced route having the minimized travel commitment. As shown in FIG. 5A, the advanced route having the minimized travel commitment appears in the closest choices column 520.

In one implementation, the closest choices column 520, the next closest choices column 530, and the next closest choices column 540 may represent a set of locations. For example, the closest choices column 520 may represent a first set of locations. The next closest choices column 530 may represent a second set of locations. And, the next closest choices column 530 may represent a third set of locations. Each set of locations includes at least one location for each of the types of interest. The host may rearrange the order in which the locations within each set of locations are visited to determine whether the travel commitment can be further reduced. FIG. 5B illustrates an exemplary table 500B, representing the host rearrangement of the locations within the first set, the second set, and the third set of locations. For example, as shown in FIG. 5B, the host rearranges the locations within the first set such that the McDonald's™ at 555 Tuckerman Lane, Potomac, Md. is visited first, the Bp™ gas station at 1210 Seven Lock Rd., Potomac, Md. is visited second, and the Safeway™ at 1213 Seven Lock Rd., Potomac, Md. is visited third. The host may continue this process for each set of location or a selected set of locations to identify the most efficient route within each set of locations or the selected set of locations in table 500A. In either case, as the host rearranges the locations within the set of locations, the travel time and the travel distance associated with the advanced route including the rearranged locations may change. For example, as shown in FIG. 5B, the travel time and the travel distance associated with the advanced routes identified in table 500B is less than the travel time and the travel distance associated with the advanced routes identified in table 500A.

Figure 6A:
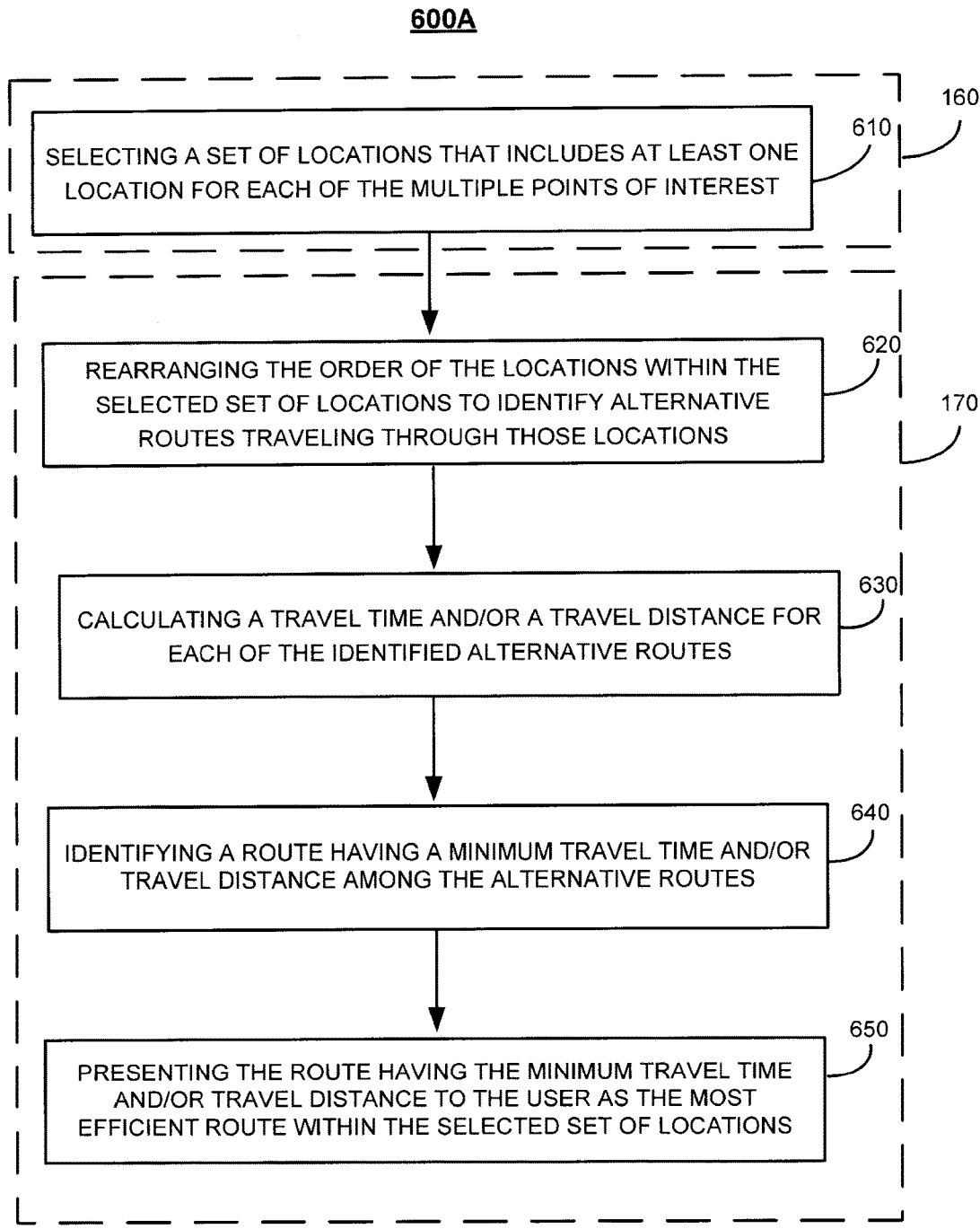
Figure 7A:
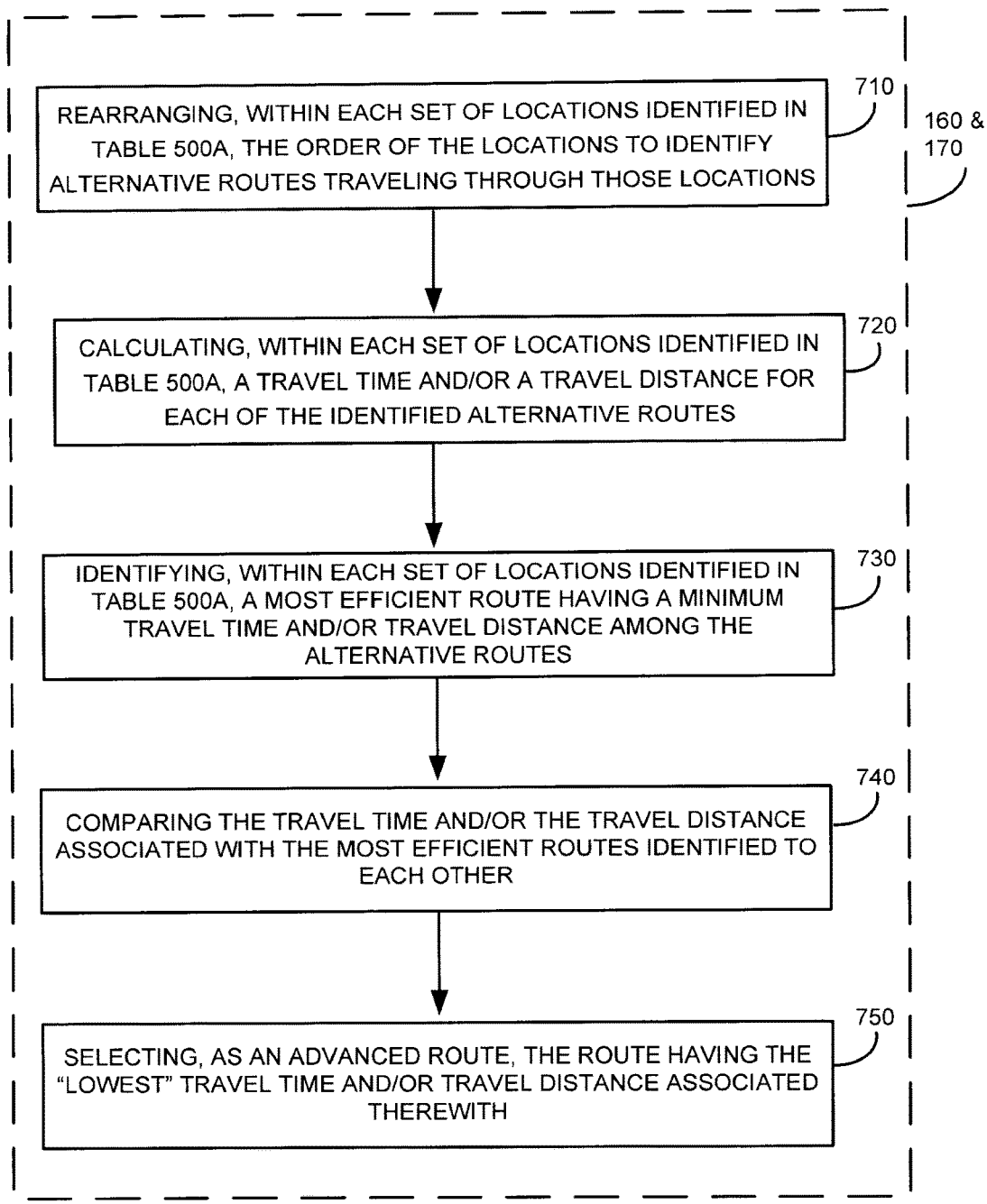

Below, FIGS. 6A-6B illustrate an exemplary process 600A and an exemplary table 600B that a host uses to identify the most efficient route for a selected set of locations in table 500A, and FIGS. 7A-7B illustrate an exemplary process 700A and an exemplary table 700B that a host may use to identify the most efficient route within each set of locations identified in table 500A.

FIG. 6A illustrates an exemplary process 600A a host may use to identify the most efficient route within a selected set of locations. The process 600A illustrates in more detail the blocks 160 and 170 associated with the process 100 described above with respect to FIG. 1. Initially, the host selects a set of locations that includes at least one location for each of the multiple points of interest (610). For example, the host may select the first set of locations (e.g., the closest choices column 520 of FIG. 5A) resulting in the minimized travel commitment. The host rearranges the order of the locations within the selected set of locations to identify alternative routes traveling through those locations (620). The host calculates a travel time and/or a travel distance for each of the identified alternative routes (630) and identifies a route having a minimum travel time and/or travel distance among the identified alternative routes (640).

To identify a route having the minimum travel time and/or travel distance, the host may use an exemplary table 600B, shown in FIG. 6B. In table 600B, the host identifies the alternative routes within the selected set of locations (e.g., the closes choices column 520 of FIG. 5A) and also identifies the travel time and the travel distance corresponding to each of the alternative routes.

As shown in FIG. 6B, the host rearranges the order in which locations within the first set (e.g., the closest choices column 520 of FIG. 5A) are visited and identifies three alternative routes in addition to the route shown in the closest choices column 520. The three alternative routes include a first route 660, a second route 670, and a third route 680. Each of the alternative routes 660, 670, and 680 include a different order in which the location for the each of the multiple points of interest is visited. For example, in the first route 660, the location for the restaurant is visited first, the location for the gas station is visited second, and the location for the grocery store is visited third. Similarly, in the second route 670, the location for the restaurant is visited first, the location for the grocery store is visited second, and the location for the gas station is visited third.

Table 600B also includes a travel time row 690A and a travel distance row 690B. The travel time row 690A includes a travel time for each of the alternative routes. The travel distance row 690B includes a travel distance for each of the alternative routes. The host compares the travel time and/or the travel distance for each of the four alternative routes (e.g., a route identified in closest choices column 520 of FIG. 5A and the three routes identified in table 600B) to identify the route with minimum travel time and/or the travel distance. As shown, the route with the minimum travel time and/or distance includes the first route 660 with a travel time of 44 minutes and a travel distance of 24.8 miles. Once the host identifies the route having the minimum travel time and/or travel distance among the alternative routes (640), the host presents the route to the user as the most efficient route within the selected set of locations (650).

FIGS. 7A-7B illustrate an exemplary process 700A and an exemplary table 700B that a host may use to identify the advanced route having the "lowest" travel time and/or the travel distance. Referring specifically to FIG. 7A, the process 700A illustrates in more detail the blocks 160 and 170 associated with the process 100 described above with respect to FIG. 1. The process 700A begins by the host rearranging, within each set of locations identified in table 500A (e.g., the closest choices column 520 and the next closest choices columns 530 and 540), the order of locations to identify alternative routes traveling through those locations (710). The host calculates, within each set of locations identified in table 500A, a travel time and/or a travel distance for each identified alternative routes (720), and identifies, within each set of locations, a most efficient route having the minimum travel time and/or travel distance among the alternative routes (730). The host may use the operation described above with respect to FIG. 6A to identify the most efficient route within each set of locations identified in table 500A. The host compares the travel time and/or the travel distance associated with the most efficient routes identified to each other (740). To perform this comparison, the host may use the exemplary table 700B that includes the travel time and the travel distance for the most efficient route within each set of locations. Table 700B includes a travel time row 740 and a distance row 750. The travel time row 740 identifies the travel time for the most efficient route within each set of locations. For example, the travel time for the most efficient route within the first set of locations is 44 minutes, within the second set of locations is 43 minutes, and within the third set of locations is 55 minutes.

The distance row 750 identifies the travel distance for the most efficient route within each set of locations. For example, the travel distance for the most efficient route within the first set of locations is 24.8 miles, within the second set of locations is 25 miles, and within the third set of locations is 30 miles. The host may use table 700B to identify and select the most efficient route with the "lowest" travel commitment, as the advanced route (750).

In one scenario, shown in FIG. 7B, one of the routes may have the shortest travel time and another route may have the shortest travel distance. For example, the most efficient route within the first set has the shortest travel distance and the most efficient route within the second set has the shortest travel time. In this scenario, the host may be configured to use the route with the shortest travel time as the advanced route. Alternatively, the host may be configured to use the route with the shortest travel distance as the advanced route.

Figure 8A:
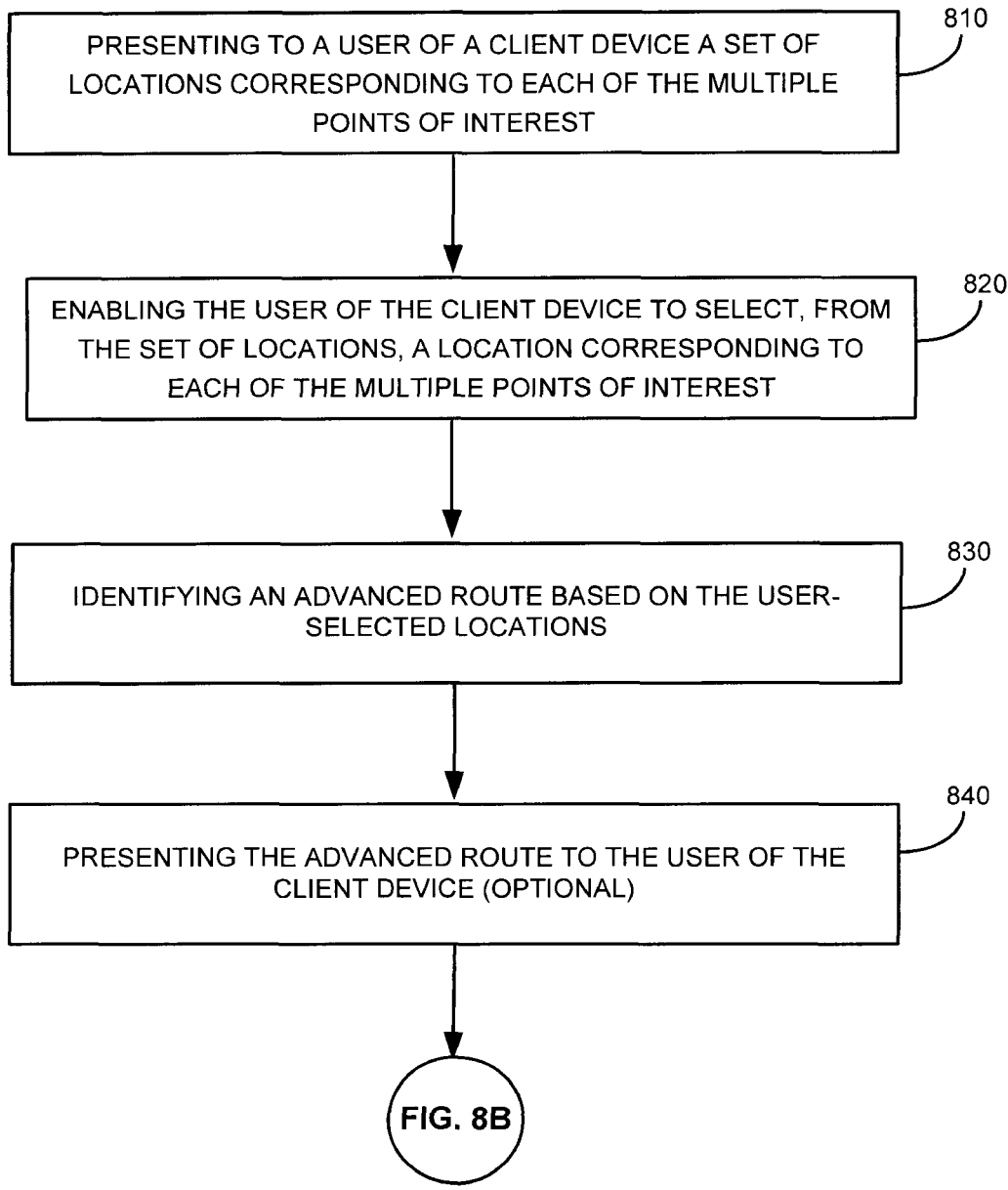
FIG. 8A illustrates an exemplary process a host may use to enable a user to identify an advanced route based on user-selected locations for the multiple points of interest.

FIG. 8A illustrates an exemplary process 800A the host uses to enable the user to identify an advanced route based on the user-selected locations for the multiple points of interest. Initially, the host presents to the user a set of locations corresponding to each of the multiple points of interest (810). In one implementation and referring again to FIG. 5A, the host may present to the user table 500A as a UI, enabling the user to select, from the set of locations, a location corresponding to each of the multiple points of interest (820). The user may select a location for each of the multiple points of interest by "clicking on," for example, the locations appearing in the closest choices column 520, the next closest choices column 530, and/or the next closest choices column 540. For example, the user may select a location for a gas station from the closest choices column 520 by selecting the "1210 Seven Lock Rd. Potomac, Maryland" icon. And, the user may select a location for the restaurant from the next closest choices column 530 by selecting the "555 Tuckerman Lane, Potomac, Maryland" icon. Similarly, the user may select a location for the grocery store from the closest choices column 520 by selecting "1213 Seven Lock Rd, Potomac, Maryland" icon. In response, the host identifies an advanced route based on the user-selected locations (830). The host may optionally present the advanced route to the user (840). The host also may present to the user alternatives to the user's selected route, enabling the user to compare the travel commitment of the selected route with the travel commitment of the other routes and to make an informed decision about which route the user wishes to travel. The alternatives may include substituted points of interest and/or it may rearrange an order of travel among points of interest.

Figure 8B:
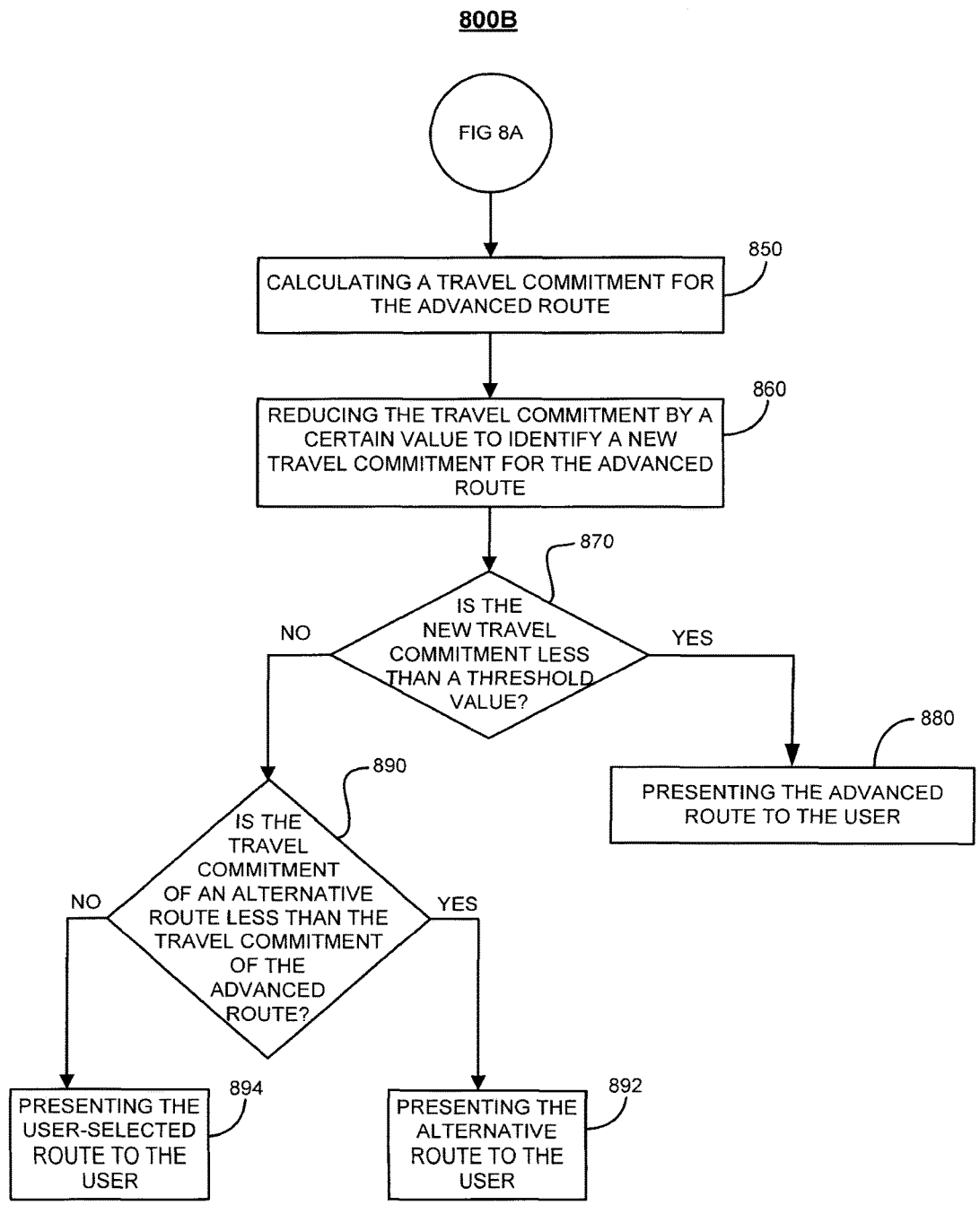
FIG. 8B illustrates an exemplary process a host may use for applying more weight to user-selected locations for the multiple points of interest.

Alternatively and prior to presenting the user-identified advanced route to the user (840), the host may perform a preliminary analysis on the user-identified advanced route. For example, the host may give the user-identified advanced route more weight than other alternative routes presented in the UI 500A, and the host may select the user-identified advanced route if its travel commitment is less than a threshold value. FIG. 8B illustrates an exemplary process 800B that a host uses for applying more weight to the user-identified advanced route and selecting the user-identified advanced route if its travel commitment is less than a threshold value. Initially, the host calculates a travel commitment for the advanced route (850). The host reduces the travel commitment by a certain value to identify a new travel commitment for the advanced route (860). The host determines whether the new travel commitment is less than the threshold value (870). If so, then the host presents the advanced route to the user (880). Otherwise, the host determines whether one of the alternative routes presented in the UI 500A has a travel commitment less than the travel commitment of the user-identified advanced route (890). If so, then the host presents the alternative route to the user (892). If not, then the host presents the user-selected route to the user (894).

Figure 9B:
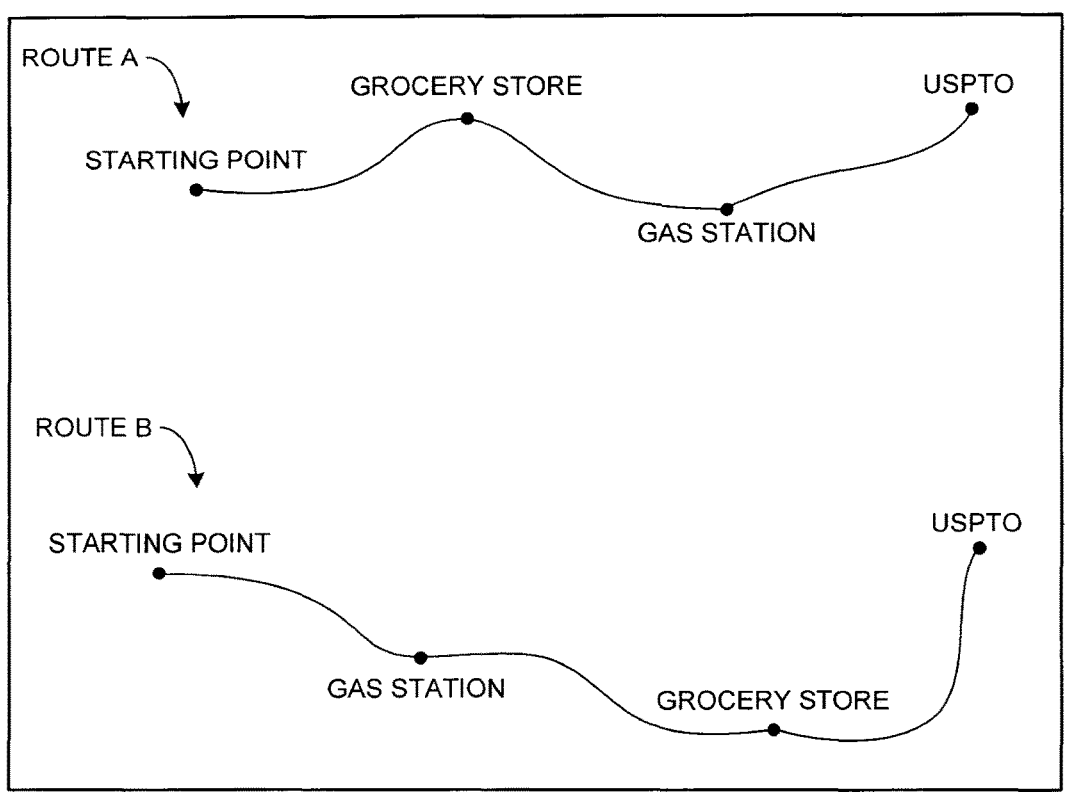

FIG. 9A illustrates an exemplary UI 900A that displays multiple routes responsive to a search query, and that enables the user to select from among the displayed multiple routes. The UI 900A represents a message that may be presented to the user who is traveling from "1425 K St. NW, Washington, D.C. 20005" toward the "United States Patent and Trademark Office" ("USPTO"), and who seeks a route that enables the user to stop by "a gas station" and "a grocery store."

As shown in FIG. 9A and described above, the UI 900A notes the origin location, the destination location, and the multiple points of interest the user has previously specified via, for example, the UI 200A. The UI 900A communicates to the user multiple routes that are responsive to the search query. The multiple routes may include, for example, a Route A and a Route B. Route A has total travel time of 45 minutes and begins at the origin location and travels first through the grocery store location and then the gas station location before reaching the destination of the USPTO.

In contrast to Route A, Route B has total travel time of 60 minutes and begins at the origin location and travels first through the gas station location and then the grocery store location before reaching the destination of the USPTO. As shown, the locations associated with the gas station and the grocery store appearing in Route B are different from the locations associated with the gas station and the grocery store appearing in Route A. The user may select either Route A or Route B by selecting the box corresponding to Route A or Route B. Upon choosing Route A or Route B, the host may provide point-to-point directions/maps to the user for Route A or Route B, accordingly. In a different implementation, the user selects both Route A and Route B to, for example, view a more detailed map associated with each before selecting either Route A or Route B. In such a scenario, the host generates another UI, such as, for example, the UI 900B illustrated by FIG. 9B to graphically illustrate the two competing routes to the user. The UI 900B includes a graphical representation of Route A and Route B. As shown, Route A passes through different locations associated with the gas station and the grocery store than Route B and appears to have less travel time and/or travel distance associated with it. Upon viewing the graphical representation of the two competing routes, the user may be able to easily make a decision regarding which route to take and upon making such determination, the user may return to UI 900 to make the user's selection.

In a slightly different scenario, the UI 900B may be configured to be interactive and the user may select the desired route by clicking on the graphical representation of Route A or Route B. Similarly and referring again to FIG. 9A, the UI 900A also may be configured to be interactive. For example, the UI 900A may enable the user to change the origin location, the destination location, and the multiple points of interest previously specified by the user. The user may select the address associated with those locations to change and/or modify them. Similarly, if the user wishes to visit a point of interest at a specific location, the user may modify the host-suggested location for the point of interest by changing the address for that point of interest.

Figure 11:
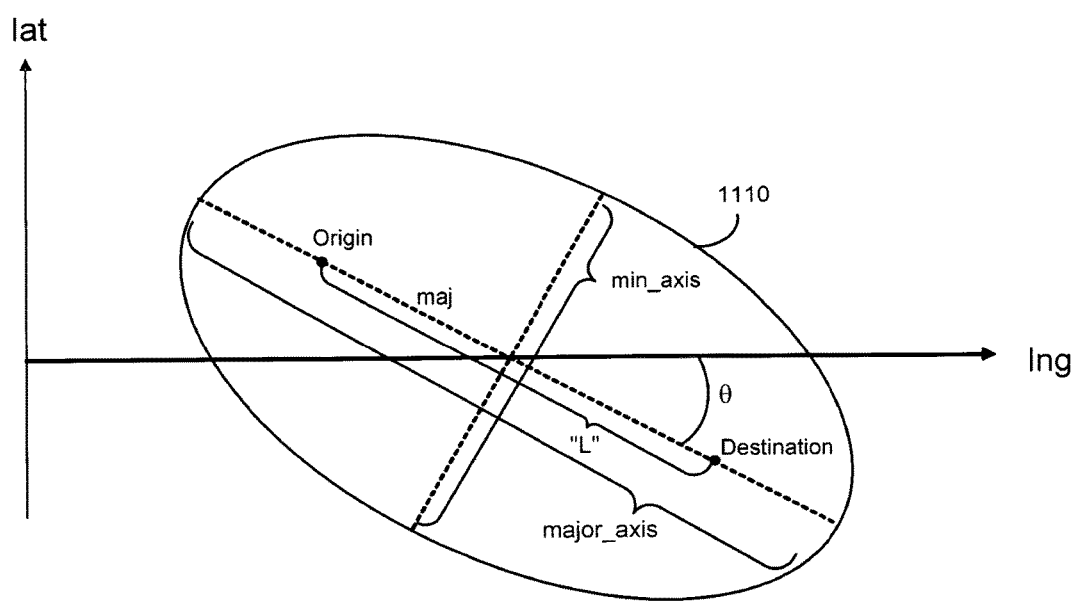
FIG. 11 illustrates an elliptical perimeter that a host uses to search for potential locations for each of user-defined multiple points of interest.

In another implementation, unlike the process 100 shown in FIG. 1, the host identifies an advanced route traveling through each of the identified points of interest without identifying a preliminary route (130) and without identifying a perimeter around the preliminary route (140). Instead, the host identifies a perimeter around the origin location and the destination location. In particular, after receiving the origin location and the destination location from the client device, the host identifies a perimeter that surrounds the origin location and the destination location, and within the perimeter, the host identifies a set of locations associated with each of the points of interests. For example, as shown in FIG. 11 and further described below, in one implementation, the host identifies a perimeter having an elliptical shape surrounding the origin location and the destination location and identifies, within the elliptical perimeter, a set of locations for each of the points of interest. A point of interest may refer to an establishment that includes multiple locations associated therewith. For example, the point of interest may refer to any gas station and/or a brand gas station at different locations.

One example will be described to illustrate how the host may identify an advanced route traveling through a location associated each of the multiple points of interest without necessarily computing a preliminary route and forming the elliptical perimeter around the preliminary route. In this example, the user seeks to visit multiple points of interest on a route between an origin location and a destination location. The multiple points of interest include a gas station and a grocery store. The host identifies an elliptical perimeter around the origin location and the destination location, and within the elliptical perimeter, the host identifies a set of locations for the gas station and a set of locations for the grocery store. Before identifying the advanced route, the host identifies a preliminary route as a starting solution. The preliminary route begins at the origin location and is configured to pass through the first location appearing in each set before reaching the destination location. The host determines a travel commitment (e.g., travel time and/or a travel distance) for the preliminary route. Then, the host identifies another route by altering the order in which the previously selected locations for each of the multiple points of interest are visited. Additionally or alternatively, the host identifies another route by choosing from each set a different location for some or all of the multiple points of interest. The host determines the travel commitment for the new route and compares the travel commitment of the new route to the travel commitment of the preliminary route. If improvement in the travel commitment has occurred (e.g., the travel time and/or the travel distance is further minimized), the host uses the new route as the preferred route. If the improvement in the travel commitment has not occurred (e.g., the travel time and/or the travel distance is not further minimized), the host uses the preliminary route as the preferred route.

The host continues these operations for a specified number of times until all locations within each set have been considered, a time limitation has been reached, or a relative improvement in each iteration is marginal. Using the time limitation may enable the host to identify an advanced route in a timely manner.

Figure 10:
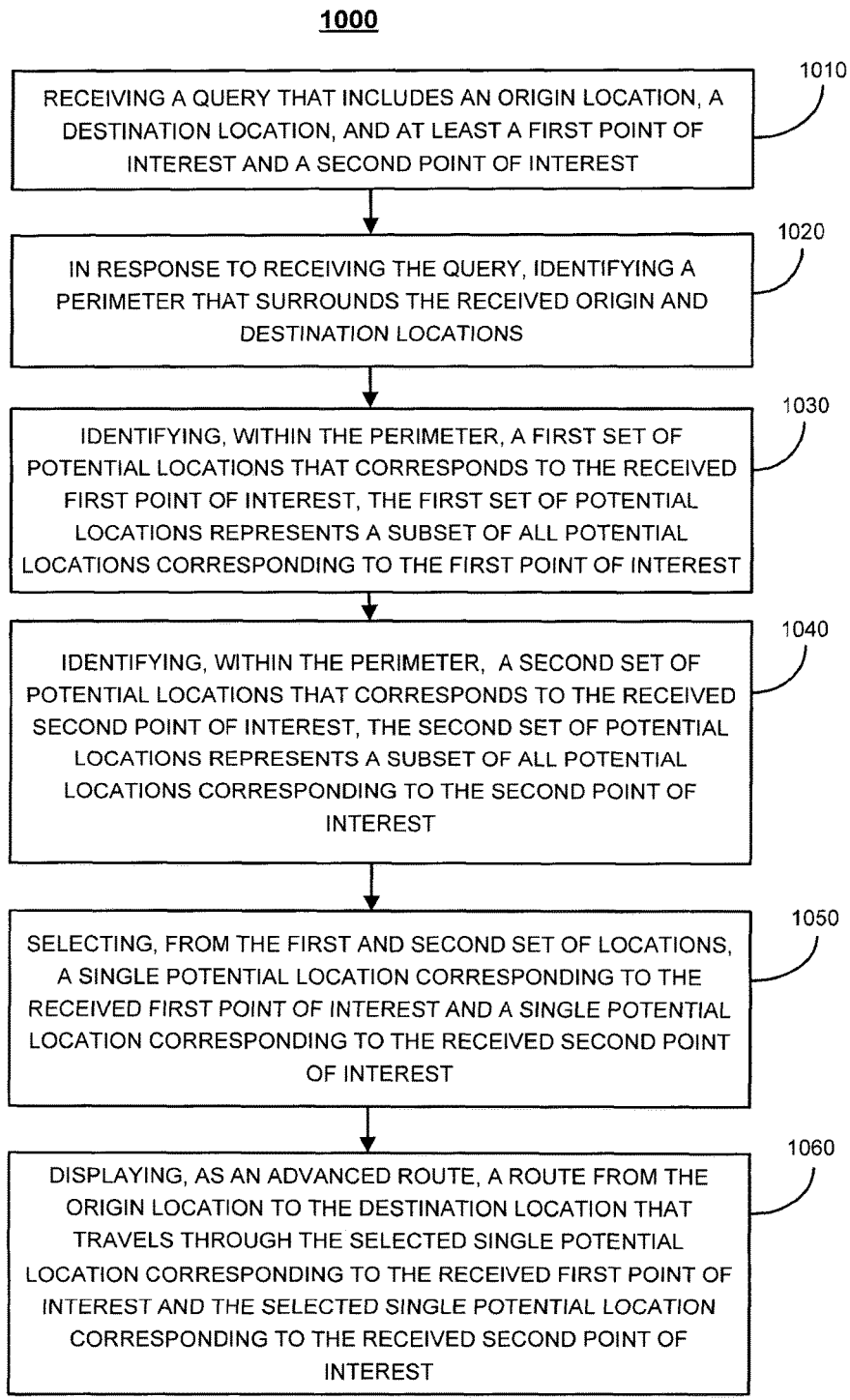
FIG. 10 illustrates another exemplary process that a host uses to identify an advanced route between an origin location and a destination location.

An exemplary process 1000 illustrated by FIG. 10, may be used by the host to identify an advanced route based on the above-described example. Below, process 1000 is described with brief reference to other processes illustrated by figures, each of which is later described separately. Process 1000 begins with receiving a query that includes an origin location, a destination location, and at least a first point of interest and a second point of interest (1010). The first and/or second points of interest may refer to an establishment that includes at least multiple locations associated therewith. In keeping with the above-described example, the first point of interest includes a gas station and the second point of interest includes a grocery store for purposes of this description. The host receives the query via, for example, a request and/or message from the client device through UI 200 shown in FIG. 2A.

In response to receiving the query, the host identifies a perimeter that surrounds the received origin and destination locations (1020). As shown in FIG. 11, the perimeter may include an elliptical perimeter 1110 surrounding the origin and destination locations. In another implementation, the perimeter may include other patterns such as, for example, square, rectangular, circular, and/or non-geometric patterns. The host may use an exemplary process 1200 described with respect to FIG. 12 to identify the elliptical perimeter 1110.

The host identifies, within the perimeter, a first set of potential locations that corresponds to the received first point of interest, the first set of potential locations representing a subset of all potential locations corresponding to the first point of interest (1030). The host also identifies, within the perimeter, a second set of potential locations that corresponds to the received second point of interest, the second set of potential locations representing a subset of all potential locations corresponding to the second point of interest (1040). The host selects, from the first and the second sets of potential locations, a single potential location corresponding to the received first point of interest and a single potential location corresponding to the received second point of interest (1050). In keeping with the above described example, the host selects, from each set, a location for the gas station and the grocery store, using an exemplary process 1300 described with respect to FIG. 13. The host then displays, as an advanced route, a route from the origin location to the destination location that travels through the selected single potential location corresponding to the received first point of interest and the selected single potential location corresponding to the received second point of interest (1060). Again, keeping with the above-described example, the process 1000 resolves an advanced route that includes a location for the gas station and the grocery store.

A search area 1100, such as that illustrated by FIG. 11, includes an exemplary perimeter that the host may use to search for the potential locations for each of the received first and second points of interest. The search area 1100 includes an origin location, a destination location, and an elliptical perimeter 1110. The elliptical perimeter 1110 includes a major-axis and a minor-axis, and is rotated with respect to the longitudinal axis by a rotation angle θ. The rotation angle θ may be found by a vector in latitude and longitude space from origin location to the destination location.

$$\theta = \tan^{-1}(d\text{lat}/d\text{lng}) \quad \text{(Equation 1)}$$

Figure 12:
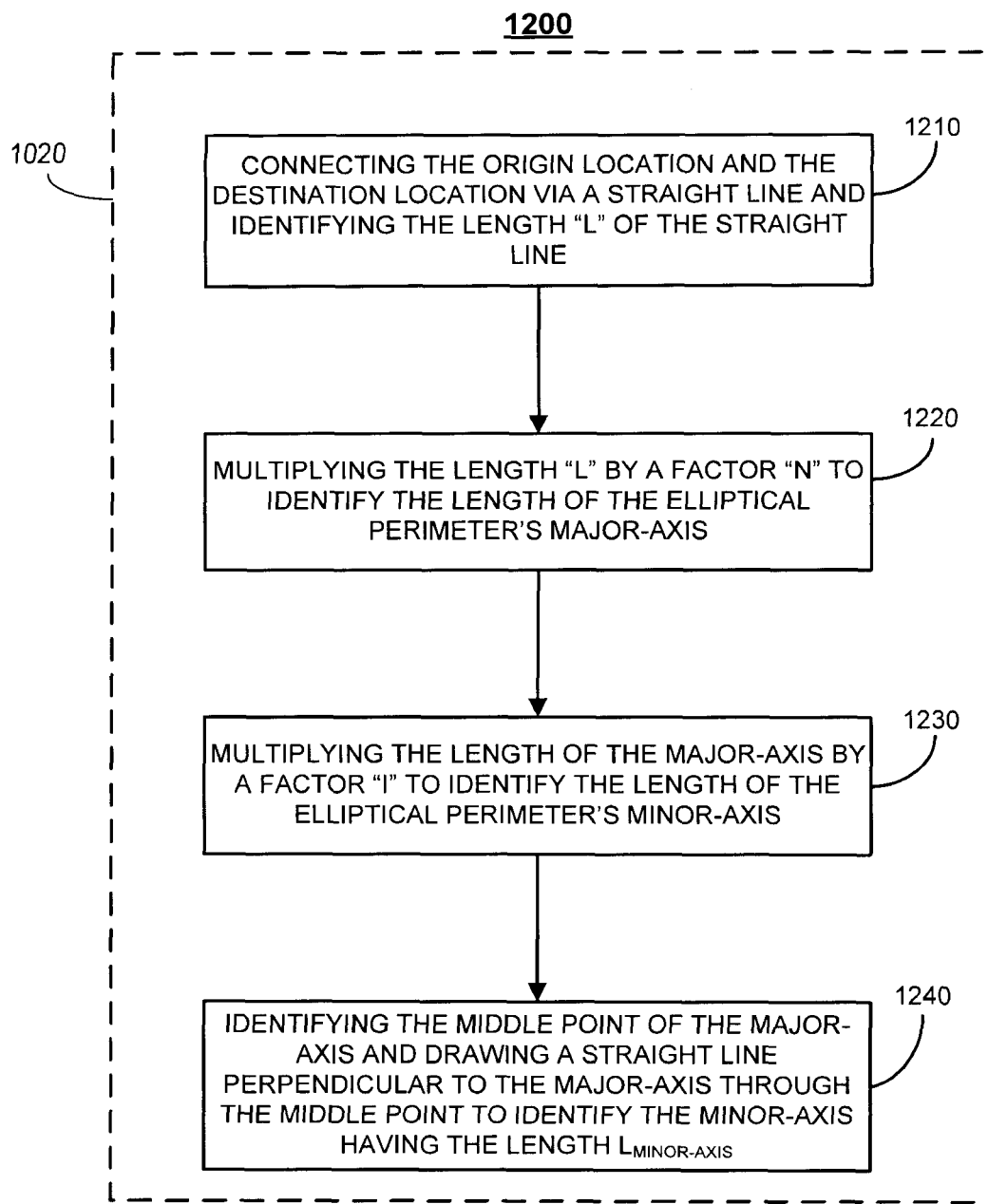
FIG. 12 illustrates a process the host uses to identify the elliptical perimeter illustrated in FIG. 11.

The host may use an exemplary process 1200, such as that illustrated by FIG. 12, to identify the elliptical perimeter 1110. The exemplary process 1200 connects the origin location and the destination location via a straight line and identifying the length "L" of the straight line (1210). The host then multiplies the length "L" by a factor "N" to identify the length of the elliptical perimeter's 1110 major-axis (1220).

$$L_{major\text{-}axis} = L*N \quad \text{(Equation 2)}$$

Where "N" includes a value greater than one to extend the ellipse beyond the origin and destination locations. In one implementation, "N" has a value 1.5. The host then equally extends each side of the straight line to form the major-axis, as shown in FIG. 11. In another implementation, to form the major-axis, the host extends each side of the straight line by a factor N (or by factors $N_1$ and $N_2$ that differ). In this implementation, the length of the elliptical perimeter's 1110 major-axis may be defined by equation 3.

$$L_{major\text{-}axis} = L + 2N \quad \text{(Equation 3)}$$

In either case, the host multiplies the length of the major-axis by a factor "I" to identify the length of the elliptical perimeter's minor-axis (1230).

$$L_{Minor\text{-}axis} = L_{Major\text{-}axis} * I \quad \text{(Equation 4)}$$

Where "I" includes a value less than one to scale the major-axis's length. In one implementation, "I" has a value 0.5. The host then identifies the middle point of the major-axis and draws a straight line perpendicular to the major-axis through the middle point to identify the minor-axis having the length $L_{Minor\text{-}axis}$ (1240), as shown in FIG. 11.

In one implementation, the host may check to see whether all the identified points of interest include at least one location within the elliptical perimeter 1110. If not, the host may expand the elliptical perimeter by increasing the length of the major-axis and/or minor-axis. To keep with the above described example, the host may continue this operation until the host identifies, within the elliptical perimeter 1110, at least one location for the gas station and one location for the grocery store.

Figure 13:
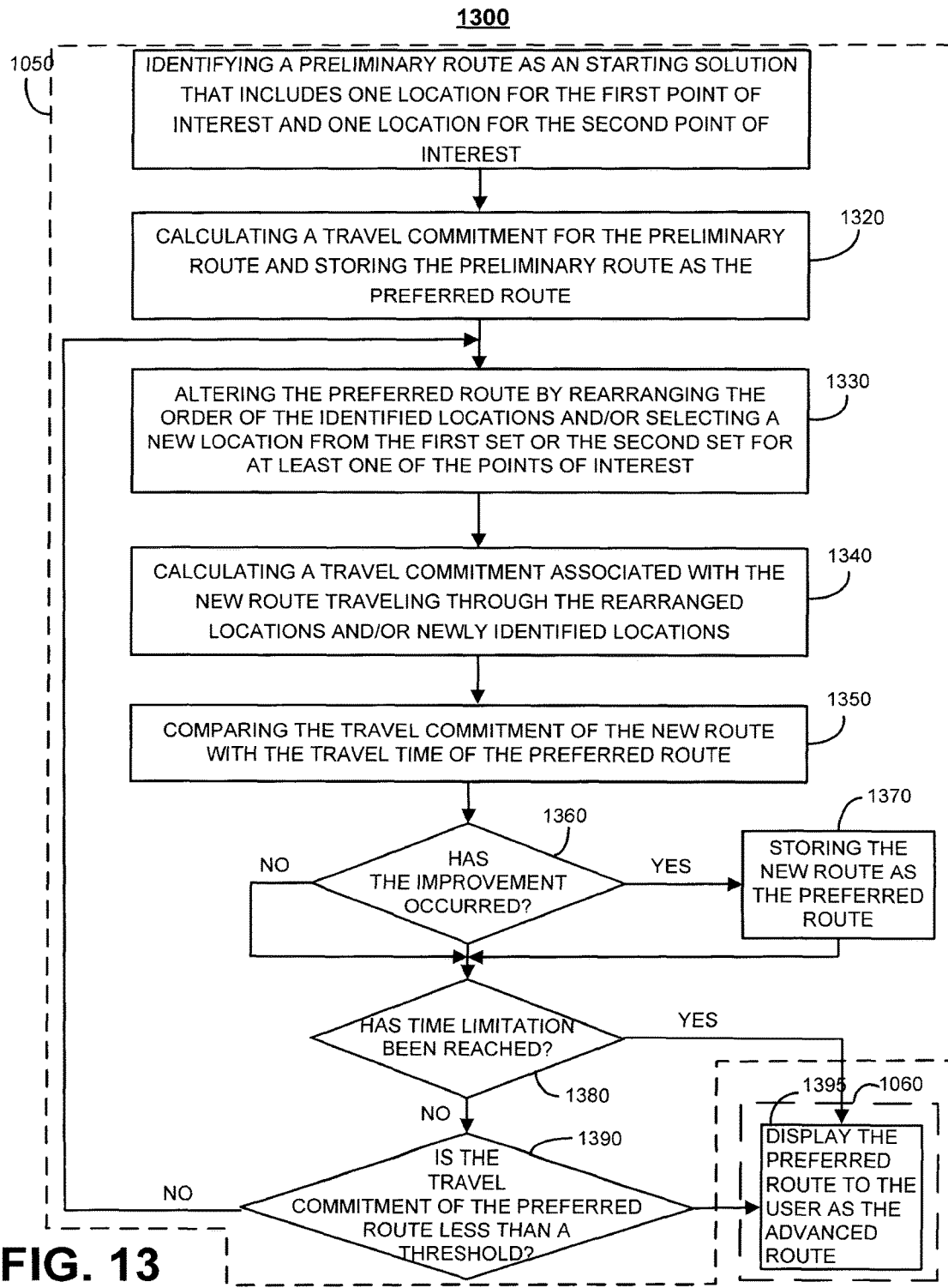
FIG. 13 illustrates an exemplary process a host uses to select a single location for each of user-identified multiple points of interest.

An exemplary process 1300, such as that illustrated by FIG. 13, includes selecting a single location for each of the received first and second points of interest. Process 1300 begins with identifying a preliminary route as a starting solution that includes one location for the first point of interest and one location for the second point of interest (1310). The host chooses the first location appearing in each set of potential locations to identify the preliminary route. Once the host has identified the starting solution, the host calculates a travel commitment (e.g., a travel time and/or travel distance) associated with the preliminary route, and the host stores the preliminary route as the preferred route (1320). Then, the host identifies another route by altering the order in which the previously selected locations for each of the multiple points of interest are visited (1330). Additionally or alternatively, the host identifies another route by choosing from each set a different location for the first and/or second points of interest (1330). To determine the alternative routes, in one implementation, the host uses a pseudo-random process to change the order in which the locations associated with the first and second points of interest are visited and/or to randomly select a new location from each set of potential locations. The host calculates the travel commitment (e.g., travel time and/or travel distance) for the new route traveling through the rearranged locations and/or the newly identified locations (1340). The host compares the travel commitment of the new route to the travel commitment of the preferred route (1350). If improvement has occurred (e.g., the travel commitment is further minimized), the host stores the new route as the preferred route (1370), and the host moves on to check whether a time limitation has been reached (1380). If improvement has not occurred (1360, no), the host moves on to check whether a time limitation has been reached (1380). If so (1380, yes), the host displays the preferred route to the user as the advanced route.

Depending on the number of potential locations within each set, a process of selecting a single location from each set may be computationally demanding and may require lengthy computation time. As such, the use of the timer in operation block (1360) allows the user to identify an optimal route and/or a route close to being optimal within a reasonable time frame. The timer may begin to expire from the time the process starts and the user may set the length of expiration period. In this manner, an optimal route may be identified and presented to the user in a reasonable time.

If the time limitation has not been reach (1380, no), the host moves on to the next operational block to determine whether the travel commitment of the preferred route is less than a threshold (1390). The user and/or the host may set a threshold to identify routes with an acceptable travel commitment. In particular, if the preferred route has a travel commitment below the threshold amount (1390, yes), then the host stops searching for alternative routes and presents the preferred route to the user (1395). If the preferred route has a travel commitment exceeding the set threshold (1390, no), the host continues alternating the preferred route by rearranging the order in which the identified locations are visited and/or selecting a new location from the first or second set of potential locations (1330). The host continues these operations (e.g., 1330 to 1390) until a time limitation has been reached or until the host identifies a preferred route with an acceptable travel commitment.

In another implementation, the process 1300 may be modified to check for a relative improvement between consecutive alternative routes. For example, the host checks to determine whether relative improvement of the travel commitment between the last ten iterations is marginal. If so, the host stops the process 1300 and displays to the user the preferred route. To do so, the host stores in a table the travel commitment associated with each newly identified preferred route, and the host references the table after the host has identified a certain number of preferred routes (e.g., ten). The host then compares the travel commitment associated with the last identified preferred route with the travel commitment associated with the previously identified preferred route. If the improvement in the travel commitment is marginal, the host stops the process 1300 and displays the last identified preferred route to the user. Otherwise, the host continues the process 1300.

Figure 14:
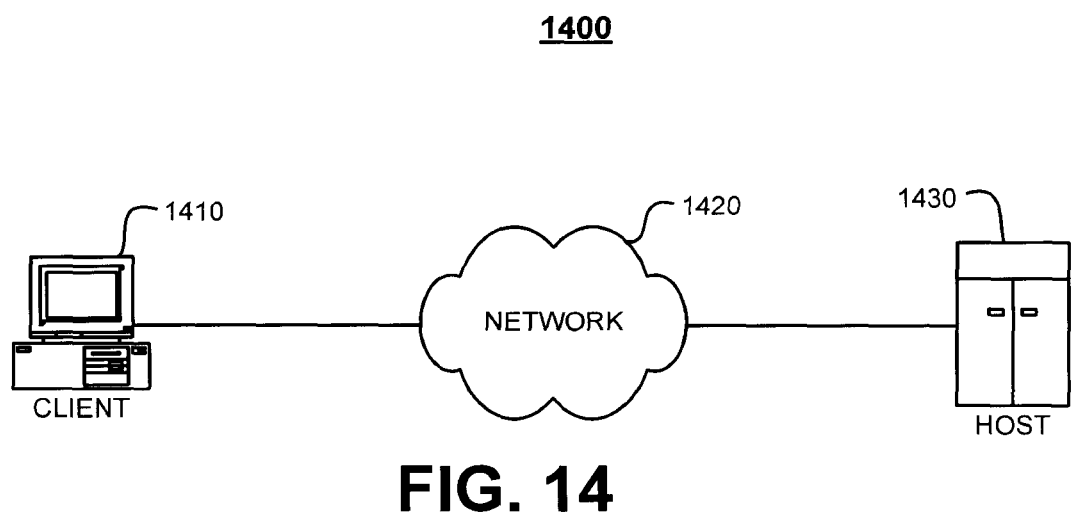
FIG. 14 illustrates a communication system, enabling a host to solicit from a client device a search query and to generate a response to the search query.

FIG. 14 illustrates a communication system 1400 is capable of delivering and exchanging data between a client device 1410 and a host 1430 through a delivery network 1420. The communication system 1400 enables the host 1430 to solicit or otherwise receive from the client device 1410 a search query and to generate a response to the search query.

Each of the client device 1410 and the host 1430 may be implemented by, for example, a general-purpose computer capable of responding to and executing instructions in a defined manner, a personal computer, a special-purpose computer, a workstation, a server, a device, a component, other equipment or some combination thereof capable of responding to and executing instructions. The client device 1410 may be configured to receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, or propagated signal that is capable of being delivered to the client device 1410 or the host 1430.

The client device 1410 may include one or more devices capable of accessing content on the host 1430. The client device 1410 may include a general-purpose computer (e.g., a personal computer ("PC")) capable of responding to and executing instructions in a defined manner, a workstation, a notebook computer, a Personal Digital Assistant ("PDA"), a wireless phone, a component, other equipment, or some combination of these items that is capable of responding to and executing instructions.

In one implementation, the client device 1410 includes one or more information retrieval software applications (e.g., a browser, a mail application, an instant messaging client, an Internet service provider client, a media player, a mobile location based services client, a mobile mapping and/or navigation client, or AOL video or other integrated client) capable of receiving one or more data units. The information retrieval applications run on a general-purpose operating system and a hardware platform that includes a general-purpose processor and specialized hardware for graphics, communications and/or other capabilities. In another implementation, the client device 1410 includes a wireless telephone running a micro-browser application on a reduced operating system with general purpose and specialized hardware capable of operating in mobile environments.

In this implementation, the client device 1410 is configured to generate a search query that includes an origin location, a destination location, and an indication of multiple points of interest the user wishes to visit between the origin location and the destination location. The client device 1410 also is configured to display a result responsive to the search query. For example, the client device 1410 may be configured to display an advanced route between the origin location and the destination location that includes and thus encourages travel through a location of each of the user-specified multiple points of interest. The client device 1410 also may display a map and information regarding travel time and/or travel distance for the advanced route.

The network 1420 includes hardware and/or software capable of enabling direct or indirect communications between the client device 1410 and the host 1430. As such, the network 1420 includes a direct link between the client device 1110 and the host 1130, or it includes one or more networks or subnetworks between them (not shown). Each network or subnetwork includes, for example, a wired or wireless data pathway capable of carrying and receiving data. Examples of the delivery network include the Internet, the World Wide Web, a WAN ("Wide Area Network"), a LAN ("Local Area Network"), analog or digital wired and wireless telephone networks, radio, television, cable, satellite, and/or any other delivery mechanism for carrying data.

The host 1430 includes a general-purpose computer having a central processor unit (CPU), and memory/storage devices that store data and various programs such as an operating system and one or more application programs. Other examples of the host 1430 include a workstation, a server, a special purpose device or component, a broadcast system, other equipment, or some combination thereof capable of responding to and executing instructions in a defined manner.

The host 1430 includes a host operated by an Online Service Provider that provides mapping services to subscribers. Alternatively or additionally, the host 1430 includes a search provider and/or a mobile device, such as a cellular phone or an in-vehicle navigation system. The host 1430 is configured to receive a search query, including an origin location, a destination location, and an indication of multiple points of interest. In response, the host 1430 identifies a result that is responsive to the search query. To identify the result, the host 1430 may first identify a perimeter around the origin location and the destination location. The perimeter may include an elliptical shape. The host 1430 uses the perimeter to identify, within the perimeter, a set of locations corresponding to each of the multiple points of interest. The host 1430 selects, from the set of locations identified, a location corresponding to each of the multiple points of interest for which the set of locations was identified. The host 1430 identifies an advanced route between the origin location and the destination location that includes and thus encourage travel through a location for each of the multiple points of interest.

The host 1430 may be configured to provide mapping services to the user of the client device 1410. In one example, the host 1430 is configured to generate maps and information regarding travel time, and/or travel distance for the advanced route. The host 1430 may be configured to enable selection of different types of directions. For example, the host 1430 may be configured to enable turn-by-turn voice guided navigation, mapping directions, text directions, and/or "other" types of directions, such as walking directions or public transportation directions. The host 1430 may be configured to send this information to the user of the client device 1410 via an instant messenger service, an email, or directly to a client mobile/navigation application.

In one implementation, the client device 1410 alone may perform the functions described above. For example, the client device 1410 may perform the functions described above by referencing an internal search engine. In another implementation, the host 1430 alone may perform the functions described above. In yet another implementation, the client device 1410 and the host 1430 both may perform some or all of the functions described above.

Other implementations are also contemplated. For example, the host may identify multiple alternative routes responsive to the search query, and the host may use a different presentation style to present the multiple alternative routes to the user for consideration. For example, the multiple alternative routes may be presented to the user with each of the multiple points of interest color-coded to indicate the category of the point of interest. The alternative routes may be presented in sequence or on a single map so that the user may compare the routes and select the preferred route. In another example, the keywords or terms (e.g., the origin location, the destination location and the first and second points of interest) forming the query may each be received, at the host, from a different source.

In another example, the host searches, within a perimeter surrounding the origin location and the destination location, to identify multiple points of interest that are co-located. In particular and in keeping with the above-described example, where the user is searching for a gas station and a grocery store, the host uses a perimeter, such as the elliptical perimeter 1110 illustrated by FIG. 11, to identify a location for a gas station that is located near a location for a grocery store. To this end, the host identifies, within the elliptical perimeter 1110, all locations associated with the gas station and searches for a location for a grocery store within the vicinity of each of those locations. In this manner, the host identifies a set of co-located gas stations and grocery stores. The host then identities routes traveling through each of the identified co-located gas station and grocery store and determines the travel commitment (e.g., travel time or a travel distance) associated with each route. The host then compares the travel commitment of each route to identify an advance route having the minimum travel commitment and presents that to the user. Additionally, the host may compare the travel commitment associated with the advanced route with the travel commitment associated with an advanced route identified via, for example, processes 100 and 1000 illustrated by FIGS. 1 and 10, respectively, to determine the one including the least travel commitment and to present that to the user.

In another implementation, the user may not have a particular destination in mind and may only wish to visit multiple points of interest. Thus, the user may generate a search query via, for example, a UI similar to the UI 200A in FIG. 2A that includes an origin location and a label for each of the multiple points of interest. In response, the host may identify at least one location for each of the multiple points of interest, and the host may identify an advanced route from the origin location through the location for each of the multiple points of interest.

In another implementation, the user may specify the order in which the multiple points of interest should be visited. In this scenario, the host identifies one or more locations for each of the multiple points of interest. The host identifies a preliminary route that travels through a location for each of the multiple points of interest in the user-specified order. The host determines the travel commitment for the preliminary route. The host may alter some or all of the locations for the multiple points of interest to identify a new route. The host determines the travel commitment for the new route and compares it to the travel commitment of the preliminary route. If there is an improvement, the host may use the new route as the advanced route. The host may continue this process until the relative improvement in each iteration is marginal. Alternatively, the host may continue this process until a time threshold for a route has been reached or a time limitation for computing a route has been reached.

In another implementation, the host may communicate with a calendar application or other applications used to help plan a user's day. For example, the user may have an appointment in the user's calendar to be at a particular location at a predetermined time (e.g., pick up a child at school at 4:00 pm), and the user may request a route that enables the user to stop at an ATM, a grocery store, and a gas station. The user may have previously specified this information in the calendar application and may communicate this information to the host via, for example, "clicking on" an export icon in the calendar application. Upon "clicking on" the export icon, a search query may be generated that includes the current location of the user, the destination location, and the multiple points of interest the user wants to visit along the way. The host identifies and presents to the user one or more routes responsive to the search query.

What is claimed is:

1. A method comprising:
    identifying a first route comprising an origin, a destination, and a first plurality of locations selected by a user, each of the first plurality of locations corresponding to one of a plurality of points of interest, wherein each point of interest represents a different type of location, and wherein the first route is associated with a first travel commitment;
    identifying, by at least one processor, an alternate route comprising the origin, the destination, and a second plurality of locations different from the first plurality of locations, each of the second plurality of locations corresponding to one of the same plurality of points of interest, wherein the alternative route is associated with a second travel commitment;
    determining, by the at least one processor, that the second travel commitment is less than a threshold travel commitment and that the second travel commitment is less than the first travel commitment; and
    based on determining that the second commitment is less than the threshold travel commitment and that the second travel commitment is less than the first travel commitment, providing the alternate route to the user.

2. The method of claim 1, wherein the plurality of points of interest represent multiple types of locations selected by the user.

3. The method of claim 1, wherein at least one of the plurality of points of interest comprises a brand of location.

4. The method of claim 1, further comprising providing a map of the first route and a map of the alternate route together on a graphical user interface.

5. The method of claim 4, further comprising providing, to the user, an option to select the first route and an option to select the alternate route.

6. The method of claim 5, further comprising:
    receiving, from the user, a selection of the first route or the alternate route; and
    providing a map of the selected route to the user on a graphical user interface.

7. The method of claim 1, wherein identifying the first route comprises identifying a previously identified route selected by the user.

8. The method of claim 1, wherein the second plurality of locations comprises at least one location in common with the first plurality of locations.

9. The method of claim 1, wherein the second plurality of locations comprises no locations in common with the first plurality of locations.

10. The method of claim 1, wherein each of the second plurality of locations are located within a predefined perimeter surrounding the first route.

11. The method of claim 1, wherein the first travel commitment and the second travel commitment are each associated with a travel time.

12. The method of claim 1, wherein the first travel commitment and the second travel commitment are each associated with a travel distance.

13. The method of claim 1, wherein each of the first travel commitment and the second travel commitment are associated with a combination of travel time and travel distance.

14. The method of claim 1, wherein:
    identifying the first route comprises receiving a user selection of the first plurality of locations; and
    identifying the alternate route comprises identifying the second plurality of locations based on the second travel commitment and without receiving a user selection of the second plurality of locations.

15. A system comprising:
    at least one processor; and
    at least one non-transitory computer readable storage medium storing instructions thereon that, when executed by the at least one processor, cause the system to:
    identify a first route comprising an origin, a destination, and a first plurality of locations selected by a user, each of the first plurality of locations corresponding to one of a plurality of points of interest, wherein each point of interest represents a different type of location, and wherein the first route is associated with a first travel commitment;

identify an alternate route comprising the origin, the destination, and a second plurality of locations different from the first plurality of locations, each of the second plurality of locations corresponding to one of the same plurality of points of interest, wherein the alternative route is associated with a second travel commitment;

determine that the second travel commitment is less than a threshold travel commitment and that the second travel commitment is less than the first travel commitment; and based on determining that the second travel commitment is less than the threshold travel commitment and that the second travel commitment is less than the first travel commitment, provide the alternate route to the user.

16. The system of claim 15, wherein the instructions further cause the system to provide a map of the first route and a map of the alternate route together on a graphical user interface.

17. The system of claim 16, wherein the instructions further cause the system to provide, to the user, an option to select the first route and an option to select the alternate route.

18. The system of claim 17, wherein the instructions further cause the system to:

receive, from the user, a selection of the first route or the alternate route; and provide a map of the selected route to the user on a graphical user interface.

19. The system of claim 15, wherein each of the first travel commitment and the second travel commitment are associated with a travel time or a travel distance.

20. The system of claim 15, wherein:

identifying the first route comprises receiving a user selection of the first plurality of locations; and identifying the alternate route comprises identifying the second plurality of locations based on the second travel commitment and without receiving a user selection of the second plurality of locations.

\* \* \* \* \*